(12) United States Patent
Young et al.

(10) Patent No.: US 11,048,275 B1
(45) Date of Patent: Jun. 29, 2021

(54) ENHANCED GUIDANCE LAWS FOR PRECISION OPERATIONS

(71) Applicant: Rockwell Collins, Inc., Cedar Rapids, IA (US)

(72) Inventors: Shih-Yih Young, Marion, IA (US); Kristen M. Jerome, Monticello, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 288 days.

(21) Appl. No.: 15/796,591

(22) Filed: Oct. 27, 2017

(51) Int. Cl.
    *G05D 1/00*      (2006.01)
    *B64D 43/00*     (2006.01)
    *G01C 23/00*     (2006.01)
    *G05D 1/10*      (2006.01)

(52) U.S. Cl.
    CPC ............. *G05D 1/101* (2013.01); *B64D 43/00* (2013.01); *G01C 23/00* (2013.01)

(58) Field of Classification Search
None
See application file for complete search history.

(56) References Cited

U.S. PATENT DOCUMENTS

| | | | | |
|---|---|---|---|---|
| 8,676,404 B2* | 3/2014 | Marty | ................. | G08G 5/0052 701/3 |
| 9,802,702 B1* | 10/2017 | Beckman | ............ | B64C 39/024 |
| 9,972,143 B1* | 5/2018 | Garai | ..................... | B64D 45/00 |
| 2009/0069960 A1* | 3/2009 | Lapp | .................... | G05D 1/0077 701/16 |
| 2011/0106345 A1* | 5/2011 | Takacs | .................. | G08G 5/025 701/17 |
| 2016/0229555 A1* | 8/2016 | Millin | ................... | G06T 3/4038 |
| 2018/0267560 A1* | 9/2018 | Zhu | ........................ | B64C 19/00 |

OTHER PUBLICATIONS

Annual Reviews in Control, 2018 available from sciencedirect.com. (Year: 2018).*
FAA, Approval Guidance for RNP Operations and Barometric Vertical Navigation in the U.S. National Airspace System, Advisory Circular (AC) 90-105, Jan. 23, 2009.

(Continued)

*Primary Examiner* — Todd Melton
*Assistant Examiner* — Jason R Roberson
(74) *Attorney, Agent, or Firm* — Suiter Swantz pc llo

(57) ABSTRACT

Guidance laws for generating a control command for controlling, directing, or maneuvering, a platform, or displaying a maneuver for the platform, to track a defined path upon detecting a deviation from the defined path relative to a non-linear desired path being traversed. The non-linear desired path may be a curved lateral ground path or a curved vertical ground path with a containment region forming a control boundary within which platform deviations from the defined path are contained. The guidance laws are enhanced to maintain a position of the platform within the containment region based on a threshold and a degree of accuracy associated with the threshold. Non-ideal conditions and circumstances, such as external forces, relatively low operating speeds, control delays, and discontinuities in the defined path are accounted for to reduce total system error (TSE), reduce lateral and vertical deviations, and increase precision and accuracy of platform control.

17 Claims, 28 Drawing Sheets

(56) References Cited

OTHER PUBLICATIONS

FAA, Approval Guidance for RNP Procedures with AR, Advisory Circular (AC) 90-101A, Feb. 23, 2011.
FAA, Airworthiness Approval of Positioning and Navigation Systems, Advisory Circular (AC) 20-130D, Appendix 7. RF Leg Demonstration Templates, Mar. 28, 2014.
FAA, United States Standard for Performance Based Navigation (PBN) Instrument Procedure Design, Order 8260.58, Sep. 21, 2012.
RTCA, Minimum Aviation System Performance Standards: Required Navigation Performance for Area Navigation, DO-236C, prepared by SC-227, Jun. 19, 2013.
Spitzer, Cary R., Editor, The Avionics Handbook, CRC Press, Boca Raton, Florida, 2001.
Roskam, Jan, Airplane Flight Dynamics and Automatic Flight Controls—Part I, DARcorporation, Lawrence, Kansas, Second Printing, 1998, p. 70.
Brown et al., Introduction to Random Signals and Applied Kalman Filtering, Third Edition, John Wiley & Sons, New York, 1997.
Johnson, Chris, Roll Commands for a Circular Turn, Rockwell Collins internal memo, Sep. 7, 1995.
Flight Technical Error (FTE) Analysis Report for Required Navigation Performance (RNP), Rockwell Collins internal document No. 946-1190-001, Sep. 11, 2012.
Flight Idle Descent Optimized Document, Rockwell Collins internal document.
Young, Shih-Yih (Ryan), Design of the Hybrid Great Circle Method, Version B1, Rockwell Collins internal document, Feb. 18, 2016.

* cited by examiner

308 — ↘

306-1 — Determining a radius of a curvature of the curved reference line by selecting a desired g-force associated with maneuvering the platform through the curvature.

308-1 — Determining two or more deviations and/or determining a deviation rate based on the position data, a radius, a planned vertical speed at a current position of the platform, and/or a planned altitude.

310-1 — Accounting for special conditions or circumstances such as wind, no wind, etc..

310-2 — Filtering a signal associated with at least one of: a cross-track velocity, a delta flight path angle, a vertical acceleration detection (VAD), and a deviation rate.

310-3 — Applying a flag or data bit to enable a determination that the curvature of the curved reference line indicates a right, a left turn, a descent, or an ascent.

FIG. 15

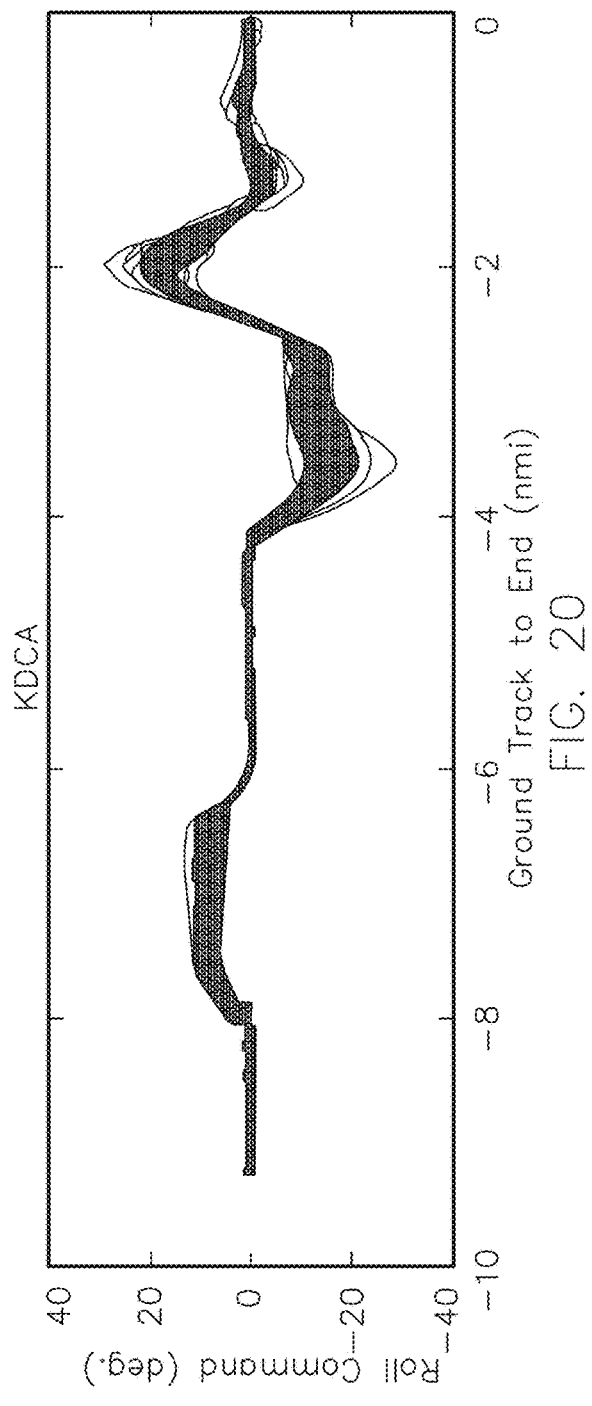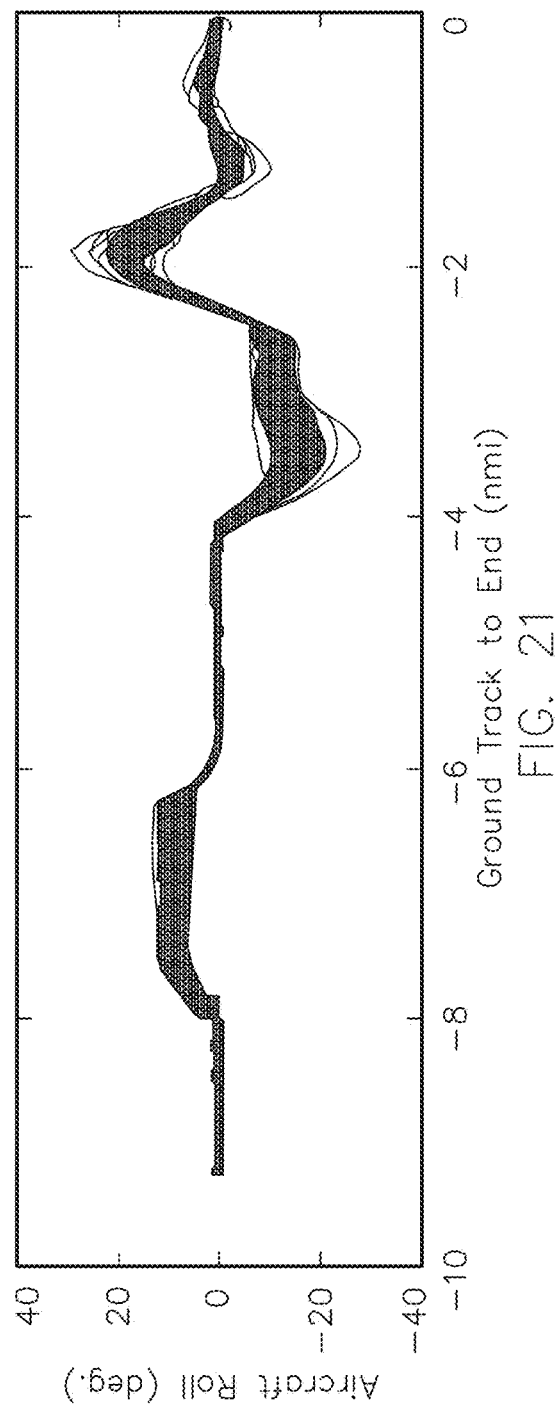

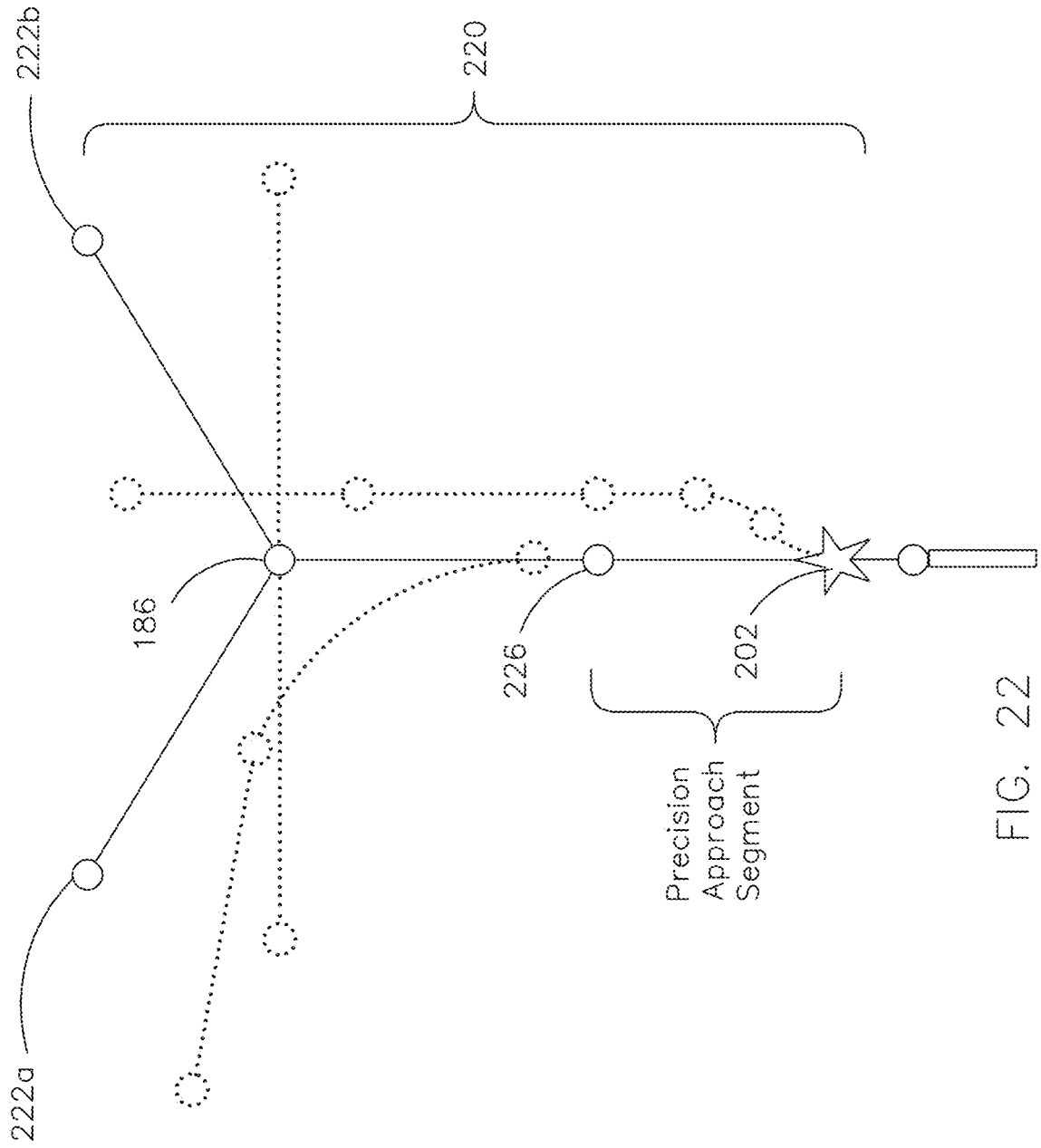

ENHANCED GUIDANCE LAWS FOR PRECISION OPERATIONS

BACKGROUND

Controlled guidance of a mobile platform such as a vehicle requires controllers with control algorithms that are precise, dependable, and robust. Although some conventional algorithms may enable the mobile platform to go from point 'A' to point 'B' safely under ideal circumstances, traversing large distances usually results less than ideal circumstances. As the use of artificial intelligence (AI) and abilities of self-controlled (e.g., autonomous) vehicles increases, the precision, dependability, and robustness of control algorithms incorporated in these vehicles correspondingly needs to increase to successfully deal with less than ideal circumstances.

Often multiple a priori parameters and constraints are computed to determine a defined path for a mobile platform. During real-time operation, these parameters and constraints are input into the mobile platform to enable real-time tracking of a desired path, the desired path representing an approximation of an ability of the mobile platform to track the defined path. The ability of the mobile platform to track the defined path or to maintain the desired path is directly related to the control algorithms incorporated in guidance control systems and their response to disturbances.

Another factor of consideration in traversing large distances is fuel economy. Control algorithms that are not able to maintain strict tolerances often result unnecessary fuel expenditures. Further, with respect to manned vehicles, operators often do not recognize when strict tolerances are not being maintained.

For passenger vehicles, sudden or rapid fluctuations in response to control commands increases passenger discomfort and peace of mind. These sudden or rapid fluctuations may be due to inadequate error reduction or error compensation in control algorithms, unfiltered control parameters, improper reference points or reference frames, overcompensating disturbance variables, improper consideration of a response delay, or combinations thereof.

Therefore, it is desirous to obtain more robust, secure, and otherwise improved guidance algorithms, systems, methods, and apparatuses.

SUMMARY

In one aspect, the inventive concepts disclosed herein are directed to a system for precision guidance incorporating enhanced guidance laws. The system may include a platform, one or more sensors on-board the platform, and a navigational guidance computer on-board the platform. The navigational guidance computer may be configured for receiving one or more inputs. For example, the one or more inputs may include navigation data indicative of a defined path from a navigation database (NDB) and position data from the one or more sensors. The navigational guidance computer may be configured for comparing juxtaposed portions of the defined path to determine a discontinuity in the defined path. The navigational guidance computer may be further configured for defining a containment region and a curved reference line of a non-linear desired path that tracks the defined path. In this regard, the containment region may be defined according to a threshold distance on either side of the defined path, and the curved reference line may be interposed between the juxtaposed portions to span the discontinuity. The navigational guidance computer may be further configured for comparing a current platform position derived from the position data to a planned platform position derived from the navigation data to determine a platform deviation relative to the defined path, the desired path, and the curved reference line. The navigational guidance computer may be further configured for outputting a reference signal for controlling the platform relative to the defined path, the desired path, and the curved reference line, to compensate for the deviation and maintain the platform deviation within the threshold distance.

In a further aspect, the inventive concepts disclosed herein are directed to an apparatus for precision guidance. The apparatus may include one or more ports for receiving a first input from a database or data structure, receiving a second input from a sensor, and for outputting a reference signal for guiding or controlling a platform relative to a non-linear portion of a desired path. The apparatus may further include a processor configured to access a non-transitory memory with instructions thereon. The processor and the non-transitory memory with instructions may be configured for: processing the first input to compare juxtaposed portions of the defined path to determine a discontinuity in the defined path; defining a containment region and a curved reference line of a non-linear desired path that tracks the defined path, the containment region defined according to a threshold distance on either side of the defined path, and the curved reference line interposed between the juxtaposed portions to span the discontinuity; comparing a current platform position derived from the second input to a planned platform position derived from the first input to determine a platform deviation relative to the defined path, the desired path, and the curved reference line; and outputting the reference signal for controlling the platform relative to the defined path, the desired path, and the curved reference line, to compensate for the deviation and maintain the platform deviation within the threshold distance.

In a further aspect, the inventive concepts disclosed herein are directed to a method for precision guidance. The method may include receiving, via a processor and a memory of a platform, one or more inputs. For example, the one or more inputs may include navigation data indicative of a defined path from a navigation database (NDB) and position data from at least one sensor on-board the platform. The method may further include comparing, via the processor, juxtaposed portions of the defined path to determine a discontinuity in the defined path; defining, via the processor, a containment region and a curved reference line of a non-linear desired path that tracks the defined path, the containment region defined according to a threshold distance on either side of the defined path, and the curved reference line interposed between the juxtaposed portions to span the discontinuity; comparing, via the processor, a current platform position derived from the position data to a planned platform position derived from the navigation data to determine a platform deviation relative to the defined path, the desired path, and the curved reference line; and outputting, to a control system, a reference signal for controlling the platform relative to the defined path, the desired path, and the curved reference line, to compensate for the deviation and maintain the platform deviation within the threshold distance.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 7A is an exemplary embodiment of a control deviation and an integrity deviation, according to the inventive concepts disclosed herein;

FIG. 15 is an exemplary embodiment of sub-steps of the method of FIG. 14, according to the inventive concepts disclosed herein;

FIG. 20 is an exemplary embodiment of a chart depicting performance of a roll command, according to the inventive concepts disclosed herein;

FIG. 21 is an exemplary embodiment of a chart depicting performance of an aircraft roll, according to the inventive concepts disclosed herein;

FIG. 22 is an exemplary embodiment of a diagram depicting one or more portions of an approach, according to the inventive concepts disclosed herein;

DETAILED DESCRIPTION OF EXEMPLARY EMBODIMENTS

Figure 1:
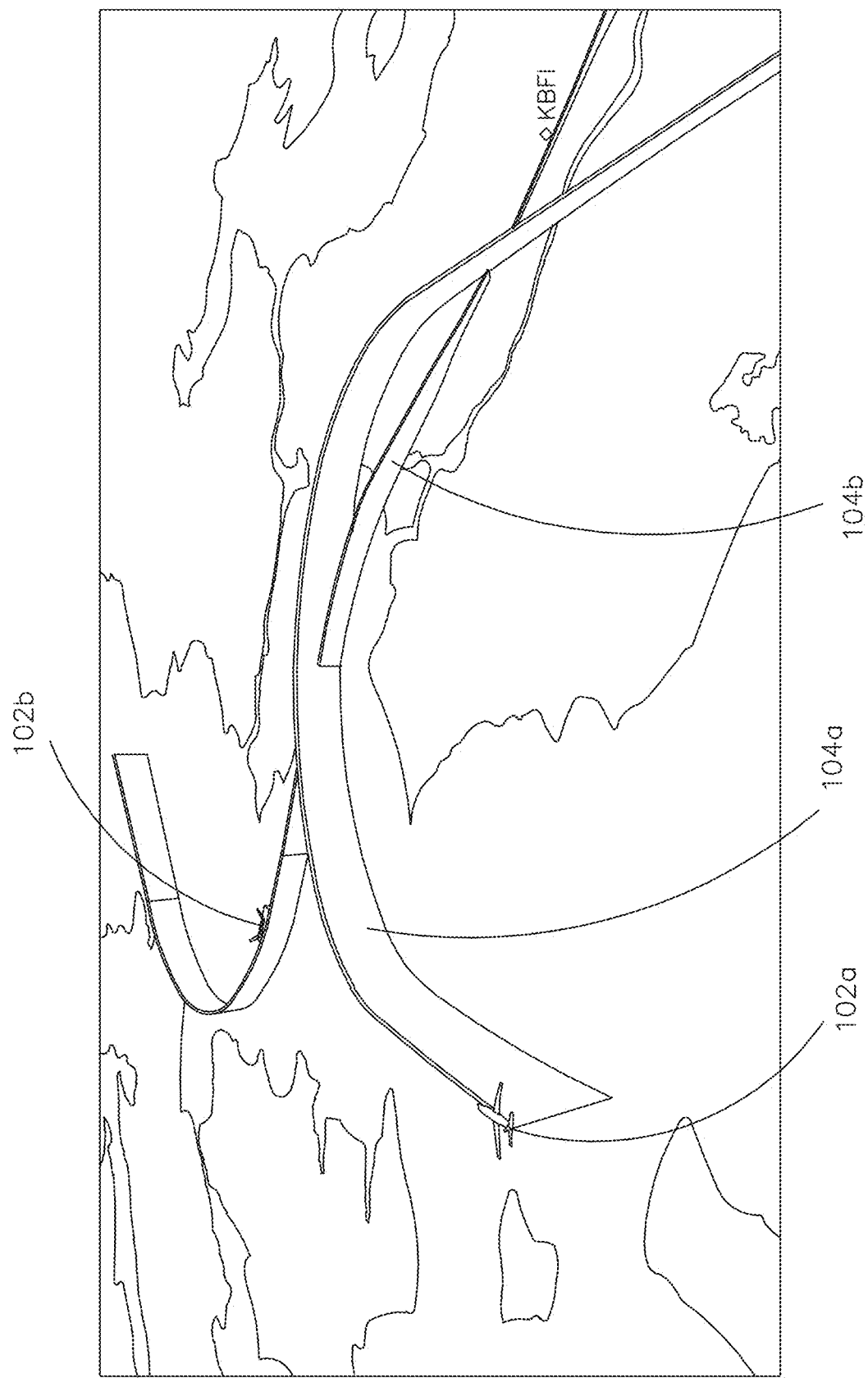
FIG. 1 is an exemplary embodiment of systems with enhanced guidance laws, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

"Guidance laws" as used herein shall mean control algorithms including feedback control algorithms useful in controllers (e.g., proportional-integral (PI) controller, proportional-derivative (PD) controllers, or proportional-integral-derivative (PID) controllers) to effect a beneficial navigational outcome based on controller gain, one or more controlled variables, or a set-point, despite effects of one or more disturbance variables (e.g., wind, or other external forces). In feedback control, the goal is to reduce an error value or error signal associated with a control signal.

"Decision Altitude" (DA) as used herein shall mean an altitude at which a missed approach must be initiated if required references to continue the approach are not established. In some embodiments, DA is used in the context of a platform making an approach using vertical guidance capabilities.

"Maneuver" as used herein shall mean the use of kinematic and potential forces to produce a movement or a series of movements, which are usually performed by an object, machine, or vehicle, with respect to a reference point or destination (e.g., performing final approach segment of a flight path).

"Area Navigation System" (RNAV) a navigation system permitting an aircraft to operate in or on any desired flight path within coverage of ground/spaced-based navigation aids or within the limits, capacity, or capability of self-contained aids, or combinations thereof.

"Required Navigational Performance" (RNP) as used herein shall mean a subset of RNAV. The RNP system or method meets a performance requirement of 95% probability that the navigation system accuracy remains within a limit or degree of accuracy defined for the RNAV or RNP operation. For example, during an RNP-0.1 operation, the total system error (TSE) remains within 0.1 nautical mile (NM) of a desired path 95% of the time, and an on-board monitoring system provides an alert to the operator when TSE exceeds the probability threshold. By way of another example, during an RNP-1.0 operation, a pilot may be provided with an alert when the probability that TSE exceeds 2 NM is greater than $10^{-5}$. RNP procedures apply to, but are not limited to, instrument departure procedures, standard terminal arrivals, and instrument approaches. It is noted that RNP accuracy may vary with a segment of a defined path performed or tracked in real-time. For example, an accuracy of RNP-1.0 may be applicable in an Initial, Intermediate, or Missed Approach segment, while an accuracy of RNP-0.3 may be applicable in a Final Approach Segment.

"Memory" as used herein, and unless otherwise specified, means any storage medium known in the art suitable for storing program instructions executable by an associated one or more processors (e.g., computer executable program code). Memory may also be stored in an organized format, encompassing, for example, a database. Memory may include one or more storage mediums. For example, memory may include, but is not limited to, a read-only memory, a random access memory, a magnetic or optical memory device (e.g., disk), a magnetic tape, a solid state drive, or combinations thereof. In embodiments, memory includes a buffer (e.g., frame buffer) and/or a cache. The memory includes non-transitory memory. In embodiments, the memory may be located remotely with respect to the platform.

"Processor" as used herein means any processing device, including but not limited to, a microprocessor, an application specific integrated circuit (ASIC), a field programmable gate array (FPGA), a central processing unit (CPU), an arithmetic logic unit (ALU), a digital signal processor (DSP), or combinations thereof.

"Module," "block" or "sub-block" as used herein means a combination of hardware and software configured to perform one or more steps, processes and/or algorithms of the inventive concepts disclosed herein.

"Flight Management System" (FMS) as used herein shall mean a system having a sensor, receiver, and processor with navigation and aircraft performance databases integrated to perform, manage, direct, or control RNAV guidance to a flight display and automatic flight control system.

"Flight Technical Error" (FTE) as used herein shall mean an individual component of TSE. The FTE of an aircraft dictates an accuracy to which the aircraft is controlled according to a function or relationship of aircraft position relative to a control output, command, or a desired position.

"Lateral Navigation" (LNAV) as used herein shall mean a function of an RNAV or RNP system directly responsible for computed, displayed, managed, controlled, performed, or otherwise provided lateral guidance to track a desired path.

"Vertical Navigation" (VNAV) as used herein shall mean a function similar to LNAV except that it is with respect to vertical guidance.

"Path Definition Error" (PDE) as used herein shall mean a difference between a defined path and a desired path.

"Leg" as used herein shall mean a portion of a total traversed path, such as a flight path. The term includes, but is not limited to, a geodesic line between two fixes (TF leg), a direct path to a fix (DF leg), a specified track to a fix that is defined by a course (CF leg), a specified track to an altitude (FA leg), and an RF leg (below).

"Radius to a Fix (RF) Leg" as used herein shall mean a constant radius circular path around a defined reference point (e.g., turn center) that starts and terminates at a fix. As used herein, this term encompasses both lateral turns and curved descents. In an exemplary embodiment, the constant radius circular path is a constant circular ground path.

Broadly, the inventive concepts disclosed herein are directed to systems, methods, apparatuses, and algorithms with improved or enhanced guidance laws as compared to conventional systems, methods, apparatuses, or algorithms. The enhanced guidance laws provide abilities to a mobile platform to accurately track a desired path, including a non-linear path, despite non-ideal conditions. Warnings or alerts are provided when the tracking is inaccurate. Reference frames for computing controller gain, set-points, or tuning parameters more precisely represent real-time scenarios by relying on earth-surface (e.g., ground) reference points, as opposed to relative air masses. Further, transitions between modes of a multi-mode controller and discontinuities between legs of the desired path are smoothed by extending a period of time associated with the transitions or by reducing deviations associated with the discontinuities. The enhancements to the guidance laws are verified by examples including statistical performance tests.

Referring now to FIG. 1, embodiments of the inventive concepts disclosed herein are directed to a mobile platform 102a and/or 102b incorporating enhanced guidance laws to track a desired path 104a and/or 104b. The desired path 104a and/or 104b including one or more non-linear or curved portions, which are tracked while accounting for external forces (e.g., wind) and other non-idealities. For example, the mobile platform 102a or 102b may include a vehicle such as a manned aircraft, unmanned aircraft such as a UAV or UAS, or a submarine that traverses a fluidic medium such as air or water, while following the desired path 104 using LNAV and/or VNAV of one or more control systems. In this regard, the desired path 104 may be derived from one or more thresholds 106 (e.g., FIGS. 7, and 11, below) and a defined path 108 (e.g., FIG. 7, and FIG. 11, below) minus any PDE. The defined path 108 may be a result of a priori data received from one or more memories associated with the mobile platform 102.

In an exemplary embodiment, the desired path 104 may be a curved ground track, a first curvature of which is attributable to a curvature of the Earth. For example, the first curvature of the desired path 104a may be approximated by an ellipsoidal Earth model. By way of another example, the first curvature may be approximated by a spherical Earth model. In some embodiments, the first curvature may be approximated by both an ellipsoidal Earth model and a spherical Earth model, such as determining the first curvature based on a weighted or averaged solution based on results from both models.

In other embodiments, a second curvature of the desired path 104 may be due to a descent, an ascent, or a turn segment in the defined path 108 (below) being tracked by the desired path 104. For example, the second curvature of the desired path 104b may be due to a descent in the defined path 108b. In some embodiments, the second curvature of the desired path 104 may be due to both a turn segment and a descent.

Figure 2:
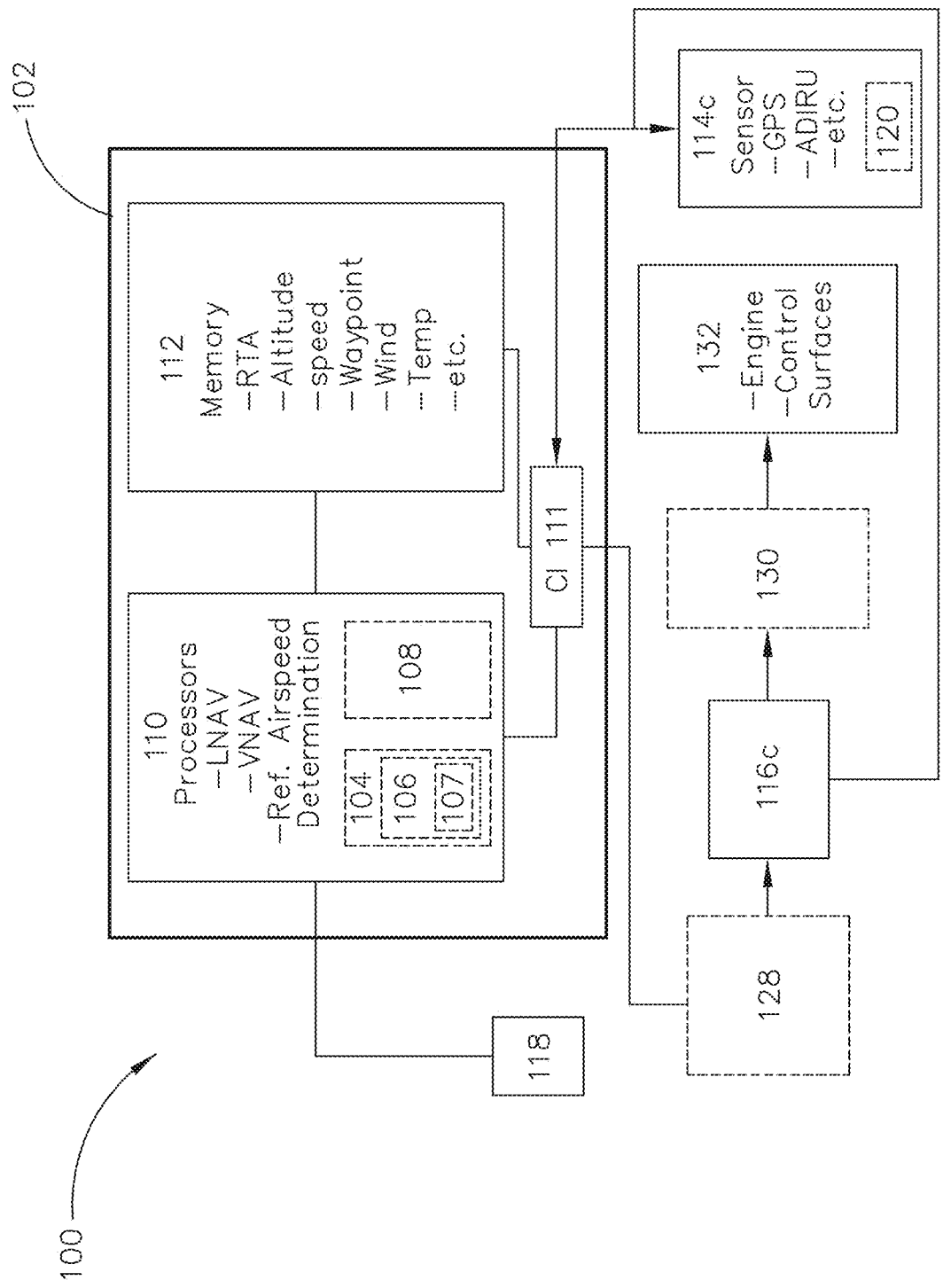
FIG. 2 is an exemplary embodiment of a system with enhanced guidance laws, according to the inventive concepts disclosed herein.

Referring now to FIG. 2, an exemplary embodiment of a system 100 incorporating enhanced guidance laws is depicted. The system 100 may include the mobile platform 102, a processor 110, a memory 112, a sensor 114, a control system 116, and an alert system 118. For example, the processor 110 may include one or more processors integrated to form a navigational guidance computer configured to receive navigational data (e.g., the a priori data and/or updated information) from the memory 112. It is noted that some components of system 100 may be located on-board the platform 102, while others may be located off of the platform 102, but at least the processor 110 and a portion of the memory 112 is located on-board the platform 102.

In an exemplary embodiment, the processor 110 may be communicatively coupled to the memory 112 and the sensors 114 to receive the defined path 108 and position data, including a position of the platform 102 relative to a desired path 104.

In some embodiments, the processor 110 may include multiple processors such as multiple CPUs connected by a central interconnect (CI) 111. For example, the CI 111 may be a shared system memory such as shared Random Access Memory (RAM). By way of another example, the CI 111 may include a peripheral component interconnect (PCI), PCI Express (PCIe), or PCIe Fiber input/output (I/O) board, expansion module, interface, or combinations thereof. In other embodiments, the processor 110 may include multiple cores, with a first one or more cores of the multiple cores (e.g., off-load engine) dedicated to processing using one or more commercial communication protocols (e.g., Ethernet), and a second one or more of the multiple cores dedicated to processing using one or more non-commercial or non-Ethernet protocols (e.g., ARINC 429 or MIL-STD-1553).

In an exemplary embodiment, the enhanced guidance laws disclosed herein, or functions of the enhanced guidance laws, are performed at a rate that is proportional to one or more processors of the processor 110. For example, if a guidance law function is run at a rate of 10 Hz, then a time associated with performing the function may be 0.1 seconds. By way of another example, if the guidance law function is run at a rate of 40 MHz, then a time associated with performing the function may be $4*10^{-7}$, or at 60 MHz, then the time associated with performing the function may be $6*10^{-7}$ seconds, and so on and so forth.

In an exemplary embodiment, the memory 112 may include, but is not limited to, one or more memories functioning as a navigational database (NDB) to provide information including, but not limited to, path constraints, required times of arrival (RTAs), associated speed, altitude, waypoint, flight modes, uplinked wind data, temperature data, weather data, platform specifications (e.g., engine, lift, drag, age, performance capabilities, etc.), or combinations thereof. In some embodiments, the NDB provides navigational data in compliance with one or more standards to the navigational guidance computer. For example, a waypoint resolution error may be less than or equal to 60 feet (about 19 m), and a flight path angle may be stored in the NDB to a resolution of hundredths of a degree (0.01°), such that the defined path 108 may be within at least five feet (1.5 m) of a published path. Thus, in some embodiments, the NDB may be incompliance with AC 20-153 or an equivalent industry standard.

In an exemplary embodiment, the sensor 114 may include multiple sensors, including at least one on-board sensor that is located on the mobile platform 102. The multiple sensors may include, but are not limited to, a global positioning system (GPS), a differential GPS, distance measuring equipment (DME), an inertial reference unit (IRU), a Light Detection and Ranging (LIDAR) sensor, a barometric altimeter, or combinations thereof. In some embodiments, a second sensor may be redundant equipment to a first sensor for use in a segment of flight such as a missed approach segment (MAS) to ensure compliance with an RNP value of RNP-1.0 or less.

In an exemplary embodiment, the control system 116 is configured as a multi-mode controller. For example, the multi-mode controller may be a multi-mode FMS, with the multiple modes including, but not limited to, an Altitude Hold Mode, a Capture Mode, a Transition to Track Mode, and a Track Mode. In other embodiments, the control system 116 is configured as a single mode controller. For example, the control system 116 may be implemented as a Lateral Path Mode (LPATH) controller or as a Vertical Path Mode (VPATH) controller.

In some embodiments, the control system 116 may be physically separated from other components of system 100. For example, the control system 116 may include an autopilot, which may be implemented on-board the platform 102 and may be physically separated from a portion of the memory 112. For instance, processor 110 may be implemented as a component of a secure UAS kit, where the mission computer storing some or all of the navigational database (NDB) is located at a ground station (not shown), while the autopilot of control system 116 is configured to be installed, attached, or otherwise located on the platform 102.

In some embodiments, the physically separated components of system 100 may be communicatively coupled via one or more data links. For example, the one or more data links may provide point-to-point (P2P) communication and/or fully networked communication (e.g., Ethernet). For instance, the data link may include, but is not limited to, a Link16 signal, a Link2000 signal, or signals from Control and Non-Payload Communications (CNPC) such as a signal having a CNPC-1000 waveform.

In an exemplary embodiment, the alert system 118 may be communicatively coupled to the processor 110 to provide an alert to the operator when one or more thresholds 106 are not being maintained. For example, a first threshold 106(1) (e.g., FIG. 7, below) may be an outer bound and a second threshold 106(2) may be an inner bound of the desired path 104 (e.g., inner and outer with respect to a turn center or an arc associated with the turn center), and the alert system 118 may include an audio system, a display, a user interface, or a combination thereof, configured to provide a tone, a vibration, a warning or alert signal, a speech announcement, or a combination thereof, when either the first threshold 106(1) or the second threshold 106(2) is not maintained relative to the desired path 104 and/or the defined path 108. For instance, the defined path 108 may be a flight path and the desired path 104 may be defined by outer and inner bounds established by one or more RNP values such that a course 120 (e.g., FIG. 7, below) an aircraft travels to track the defined path 108 remains within the inner and outer bounds of the desired path 104 as ensured by the alerts provided by the alert system 118.

It is noted that in some embodiments, the course 120 may differ from the flight path 108 at least due to PDE associated with the desired path 104. In other embodiments, the course 120 may differ from the flight path due to PDE, path steering error (PSE), and position estimation error (PEE) (e.g., difference between true position and estimated position), or combinations thereof. It is further noted that PDE combined with PSE and PEE may make up the TSE.

In an exemplary embodiment, the one or more thresholds 106 may be associated with one or more degrees of accuracy 107. For example, for a threshold associated with the LNAV function, the inner bound may be a first distance ranging from 0.1 to 1.0 NM, or a second distance ranging from 1.0 NM to 10 NM, and the one or more degrees of accuracy may be associated with a probability of maintaining one or more of the first distance and the second distance relative to a reference point or the defined path 108 over time. For instance, when the probability that the TSE associated with the platform 102 is not within a 2×RNP value or will not be within the 2×RNP value at least 99.999% of the time, an alert may be provided. In other words, an alert may be provided if the probability of TSE being maintained within the threshold will not be in compliance with greater than or equal to a four sigma standard at a specified RNP value.

Figure 3:
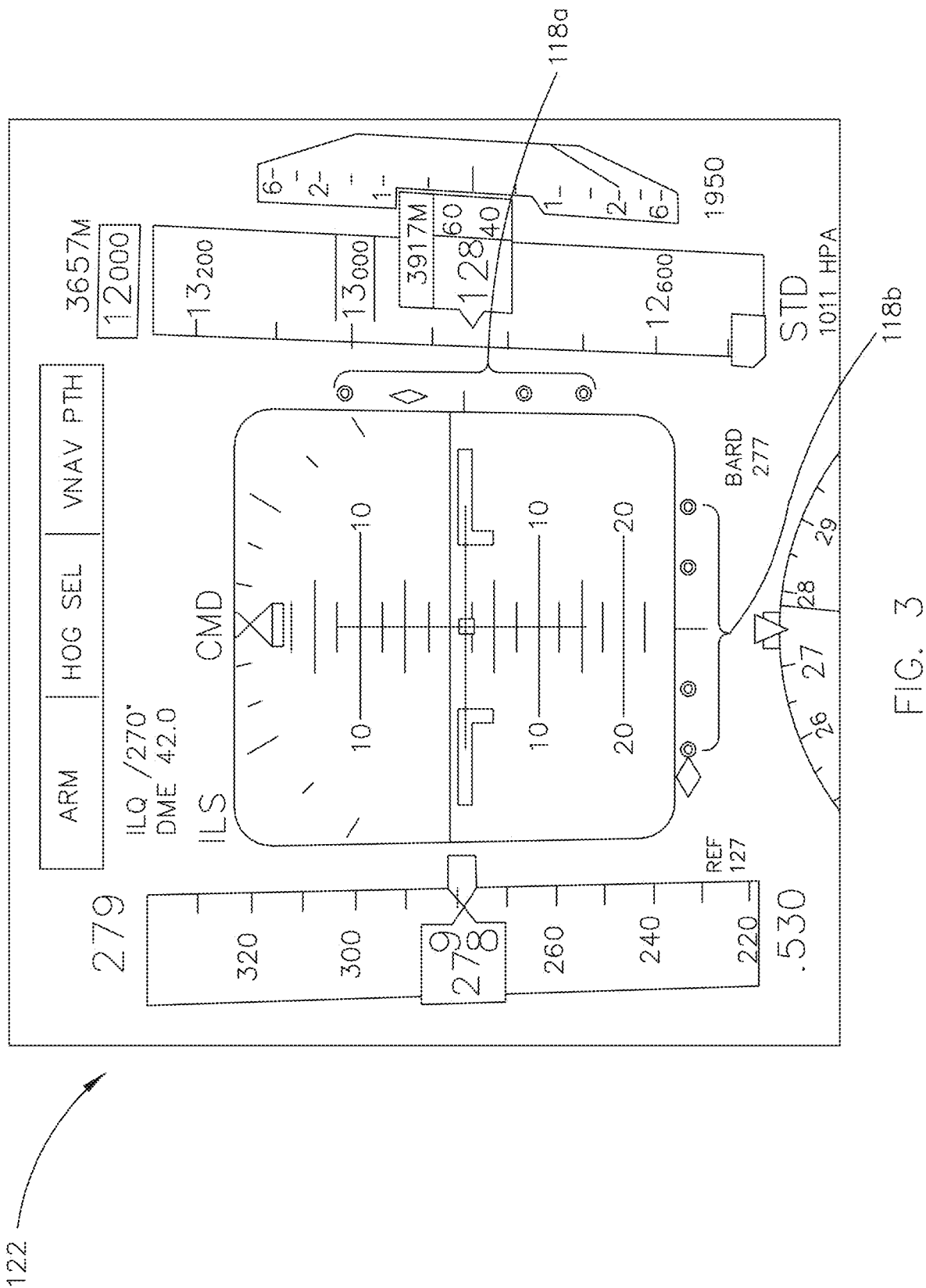
FIG. 3 is an exemplary embodiment of an alert system, according to the inventive concepts disclosed herein.

Referring now to FIG. 3, an exemplary embodiment of a display 122 with a visual alert system 118 is depicted. For example, the display 122 may include one or more indicators 118a and/or 118b, which provide a visual notification to a pilot that either a vertical threshold distance associated with the indicator 118a or a lateral threshold distance associated with the indicator 118b is not being maintained by a current platform position. In other words, the indicator 118a or 118b indicates when the current platform position is approaching and/or exceeding, respectively, the vertical or the lateral threshold distance. In some embodiments, the visual indications may be accompanied by audio (e.g., tone), or sensory (e.g., vibrational) indications.

In an exemplary embodiment, a scale factor associated with the indicators 118a and 118b may adjust according to a portion of the defined path 108 being traversed. For example, a measurement scale (e.g., two circles, diamonds, hash marks, tick marks, dots, etc.) in the indicator 118a may coincide with 150 ft. (46 m) when starting a missed approach during the Final Approach (FA) segment of a flight path, and on that measurement scale a single vertical deviation may be 75 ft. (23 m). By way of another example, in a second measurement scale, a single vertical deviation may coincide with a 500 ft. (153 m) deviation. By way of another example, a third measurement scale for the indicator 118b may coincide with 1 NM. For instance, when starting a missed approach segment, the measurement scale for the indicator 118b may coincide with an RNP requirement of RNP-1.0, where a lateral deviation may be 1 NM; whereas during level flight, a fourth measurement scale may coincide with 2×RNP-1.0, where a lateral deviation may be 2 NM. In some embodiments, the display is configured to automatically adjust the measurement scale based on the approach or segment of flight.

Figure 4:
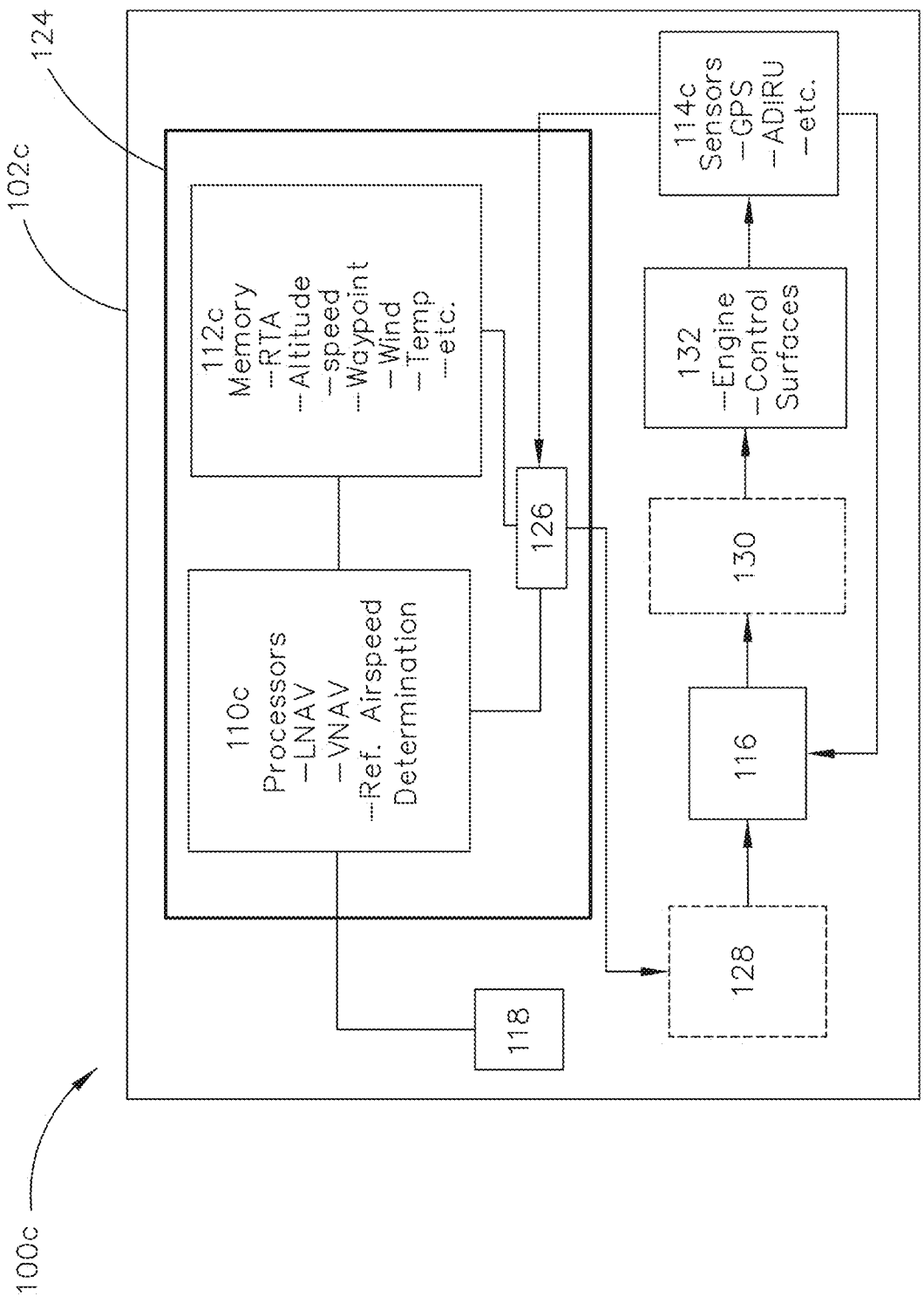
FIG. 4 is an exemplary embodiment of a system with enhanced guidance laws, according to the inventive concepts disclosed herein.

Referring now to FIG. 4, an exemplary embodiment of a system 100c with enhanced guidance laws is depicted. The system 100c may function similarly to system 100, and vice versa, except that portions of system 100c may be implemented as a single unit, an apparatus, or as one or more individual partitions. For example, the system 100c may include one or more processors 110c, a memory 112c, one or more sensors 114c (e.g., GPS, air data inertial reference unit (ADIRU), etc.), and a vehicle control system 116c (e.g., autopilot, digital engine control, etc.), where at least the processors 110c and a portion of the memory 112c may be implemented as a single unit 124. For instance, the single unit 124 may include an application specific integrated circuit (ASIC), a Field Programmable Gate Array (FPGA), a system on a chip (SOC), a digital signal processor (DSP), or combinations thereof.

In some embodiments different components of the system 100c may be separated into one or more individual partitions. For example, at least the processors 110c and a portion of the memory 112c may be implemented on an individual partition (e.g., 116), of multiple partitions of the system 100c such that logic, memory, or information for each individual partition may be managed and/or accessed separately by a central processing unit (CPU) or an operating system (OS) stored on a control display unit (CDU) or on an FMS in communication with the system 100c. In other embodiments, at least the processors 110c and a portion of the memory 112c may be implemented in a simulation computer (e.g., flight simulator) or a training system.

In an exemplary embodiment, the single unit 124 may be communicatively coupled with other components of system 100c via one or more ports 126. In some embodiments, the one or more ports 126 may be implemented as a single, bi-directional port. For example, a fiber optic coupler such as a 3 dB, 50:50 (coupling ratio) bidirectional coupler may be used. In other embodiments, the one or more ports 126 may include multiple (e.g., two or more) ports.

In an exemplary embodiment, the processor 110 of system 100 may utilize functions or logical instructions and the navigational data received from the memory 112 to generate an output or a reference signal 128. The output or reference signal 128 may include control parameters such as a roll parameter, a pitch parameter, a bank angle required (BAR) parameter, a delta BAR parameter ($\Delta$BAR), a flight path angle (FPA) parameter, a delta FPA parameter ($\Delta$FPA), or combinations thereof. The output 128 may be received by the control system 116c to generate an input or control signal 130 for one or more actuators 132. For example, the one or more actuators 132 may include a hydraulic system (e.g., hydraulic power pack), a servo motor, an engine, a brake, a control surface such as an aileron, rudder, or elevator, or combinations thereof.

Figure 5:
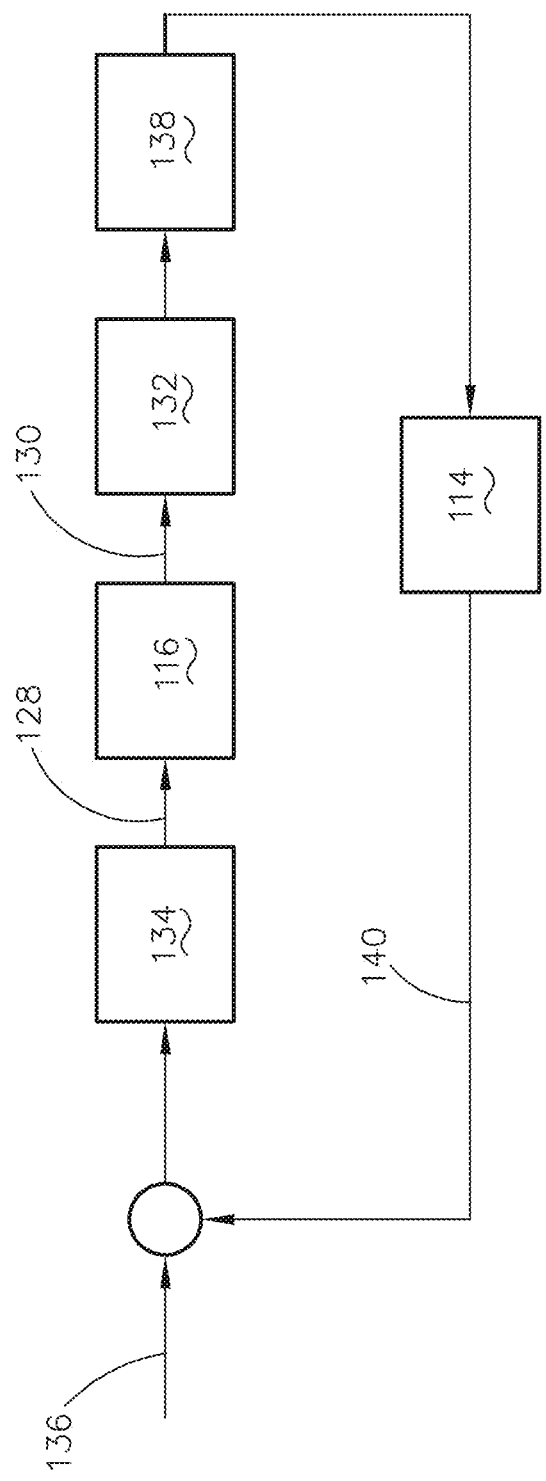
FIG. 5 is an exemplary embodiment of a block diagram indicating flow of one or more signals with respect to a guidance module, according to the inventive concepts disclosed herein.

Referring now to FIG. 5 a block, notional flow diagram is shown depicting flow between a guidance module 134, a navigation module 114 (e.g., including the sensors), a control system module 132, a first input 136, an aircraft dynamics module 138, and a second input 140. In an exemplary embodiment, the first input 136 comprises at least one of an active flight plan and a planned descent rate derived from the NDB data and updated based on the second input 140. In this regard, the contents of the reference signal 128 may depend on the first input 136. For example, if the first input 136 includes the active flight plan, then the reference signal 128 may include the roll parameter, the BAR parameter, the $\Delta$BAR parameter, or combinations thereof. By way of another example, if the first input 136 includes the planned descent rate, then the reference signal 128 may include the pitch parameter, the FPA parameter, the $\Delta$FPA parameter, or combinations thereof. In some embodiments, the first input 136 includes both the active flight plan and the planned descent rate.

Figure 6:
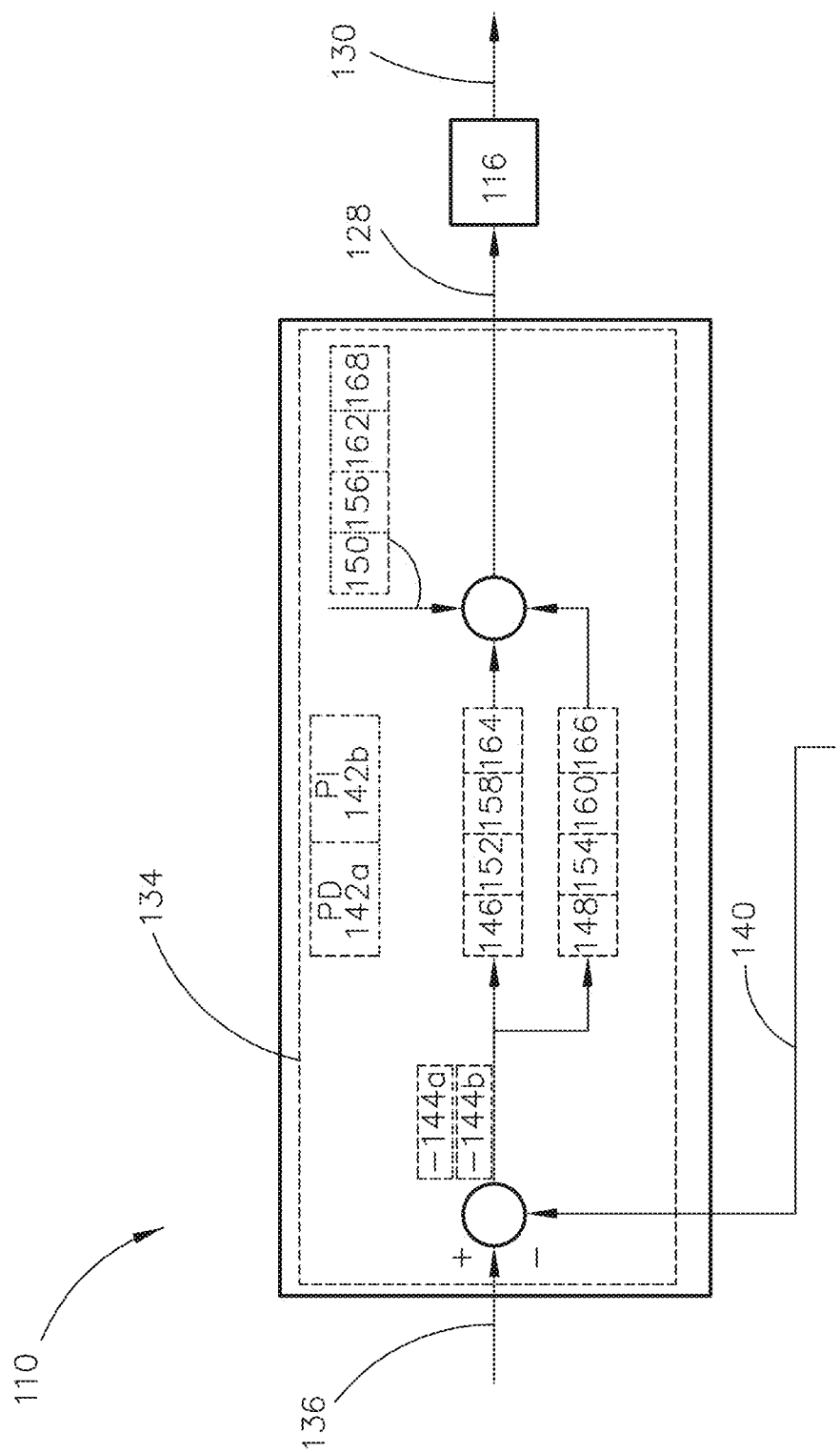
FIG. 6 is an exemplary embodiment of one or more controller configurations, according to the inventive concepts disclosed herein.

In an exemplary embodiment, the guidance module 134 may include one or more modules, sub-modules, blocks, sub-blocks, or combinations thereof. In some embodiments, the one or more modules may be a first module 142a, a second module 142b, or a combination thereof depending on the first input 136. For example, referring now to FIG. 6, a first module 142a of the guidance module 134 may include a proportional-derivative (PD) controller configured to receive the active flight plan from the first input 136 and determine a first one or more deviations 144a, the first one or more deviations 144a being a deviation from the active flight plan. Using the first one or more deviations 144a, a first controller gain 146, a second controller gain 148, and a first set-point 150 (e.g., steady-state value), the first module 142a may be configured to determine an output or reference signal 128 (e.g., roll, BAR, $\Delta$BAR, etc.) for the control system 116. For instance the output or reference signal 128 may be used to re-direct the aircraft 102 according to the active flight plan. By way of another example, a second module 142b of the guidance module 134 may include a proportional-integral (PI) controller configured to receive the planned descent rate from the first input 136 and determine a second one or more deviations 144b including a deviation rate. For instance, the second one or more deviations 144b may be a deviation from a planned descent rate. In this regard, using the second one or more deviations 144b, an actual descent rate received from the second input 140, a third controller gain 152, a fourth controller gain 154, and a second set-point 156 (e.g., vertical acceleration detection), the second module 142b may be configured to determine the output or reference signal 128 (e.g., pitch, FPA, $\Delta$FPA, etc.) for the control system 116.

It is noted that in some embodiments, the first and second module 142b of the guidance module 134 may utilize some, all, or none of the same hardware and software. In other embodiments, the first and second module 142b of the guidance module 134 may be configured to utilize at least separate software and/or firmware depending on the first input 136. It is further noted that in some embodiments, the first input 136 may include both the planned descent rate and the aircraft flight plan such that the output or reference signal 128 may include a blend of (i) at least one of a roll, BAR, and $\Delta$BAR, and (ii) at least one of a pitch, FPA, and $\Delta$FPA.

In an exemplary embodiment, the guidance module 134 may be tuned according to the specifications of the platform 102 (e.g., aircraft dynamics from module 138—recognizing that each aircraft is unique). For example, the first controller gain 146, second controller gain 148, and first set-point 150 may be specific to a first aircraft, such that the fifth controller gain 158, the sixth controller gain 160, and the third set-point 162 may be specific to a second aircraft and its individual aircraft dynamics.

In an exemplary embodiment, the guidance module 134 may be tuned according to the guidance mode and/or the specifications of the platform 102. For example, the first controller gain 146, second controller gain 148, and first set-point 150 may be specific to a first guidance mode of an aircraft, such that the seventh controller gain 164, the eighth controller gain 166, and the fourth set-point 168 may be specific to a second guidance mode of the aircraft. It is noted that other combinations of controller gains are contemplated by the inventive concepts of this disclosure. For example, other controller gains may include a controller gain that is specific to the first aircraft, the first guidance mode, and the first aircraft dynamics. Other combinations of controller gains encompassed by the inventive concepts disclosed here will be recognized by those skilled in the art.

Figure 11:
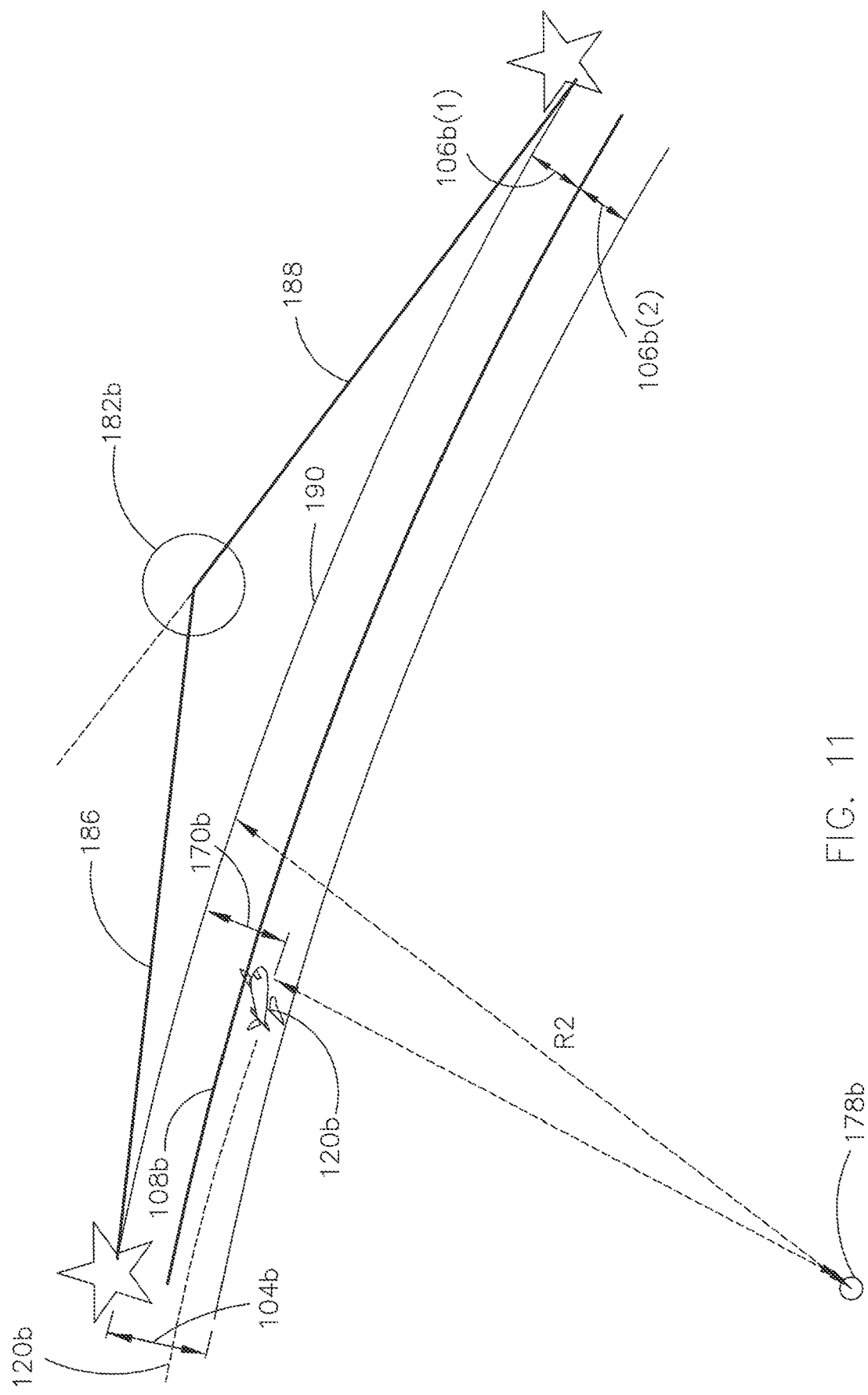
FIG. 11 is an exemplary embodiment of a vertical curve, according to the inventive concepts disclosed herein.
Figure 12:
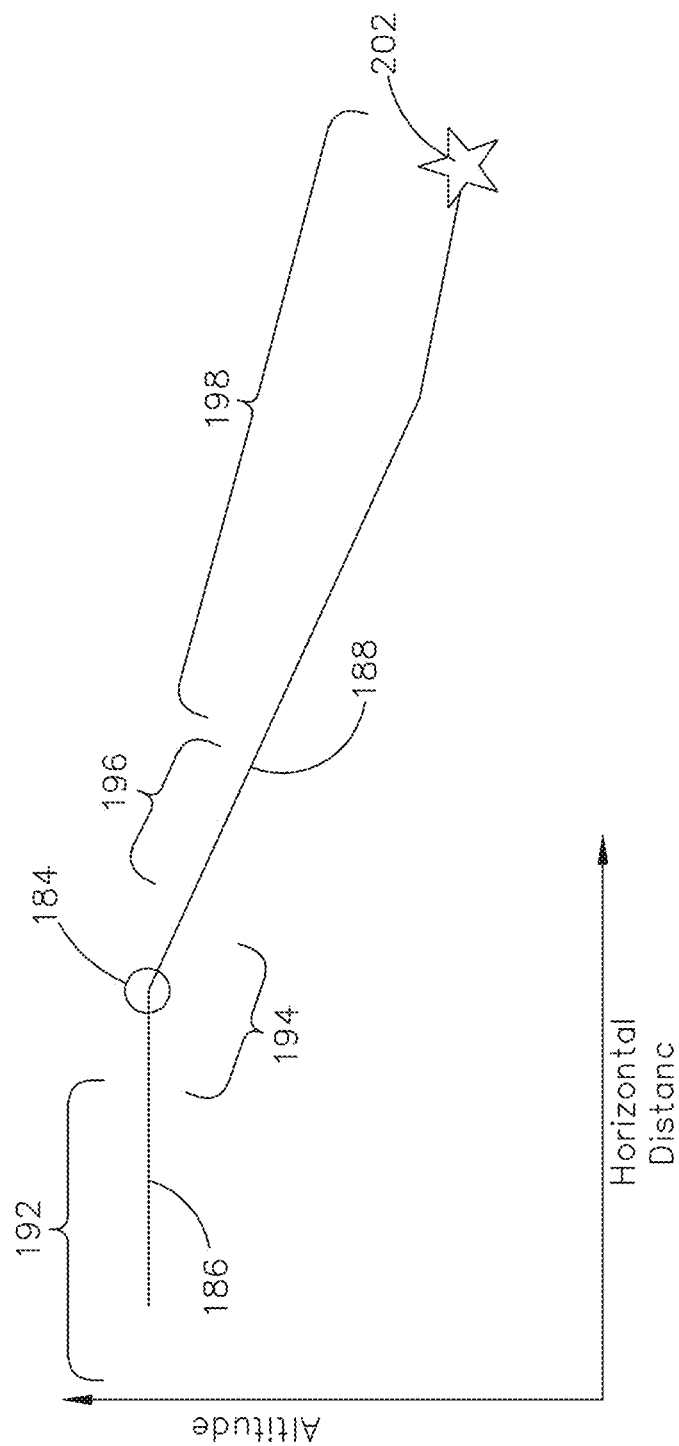
FIG. 12 is an exemplary embodiment of controller modes with respect to the defined path, according to the inventive concepts disclosed herein.
Figure 13:
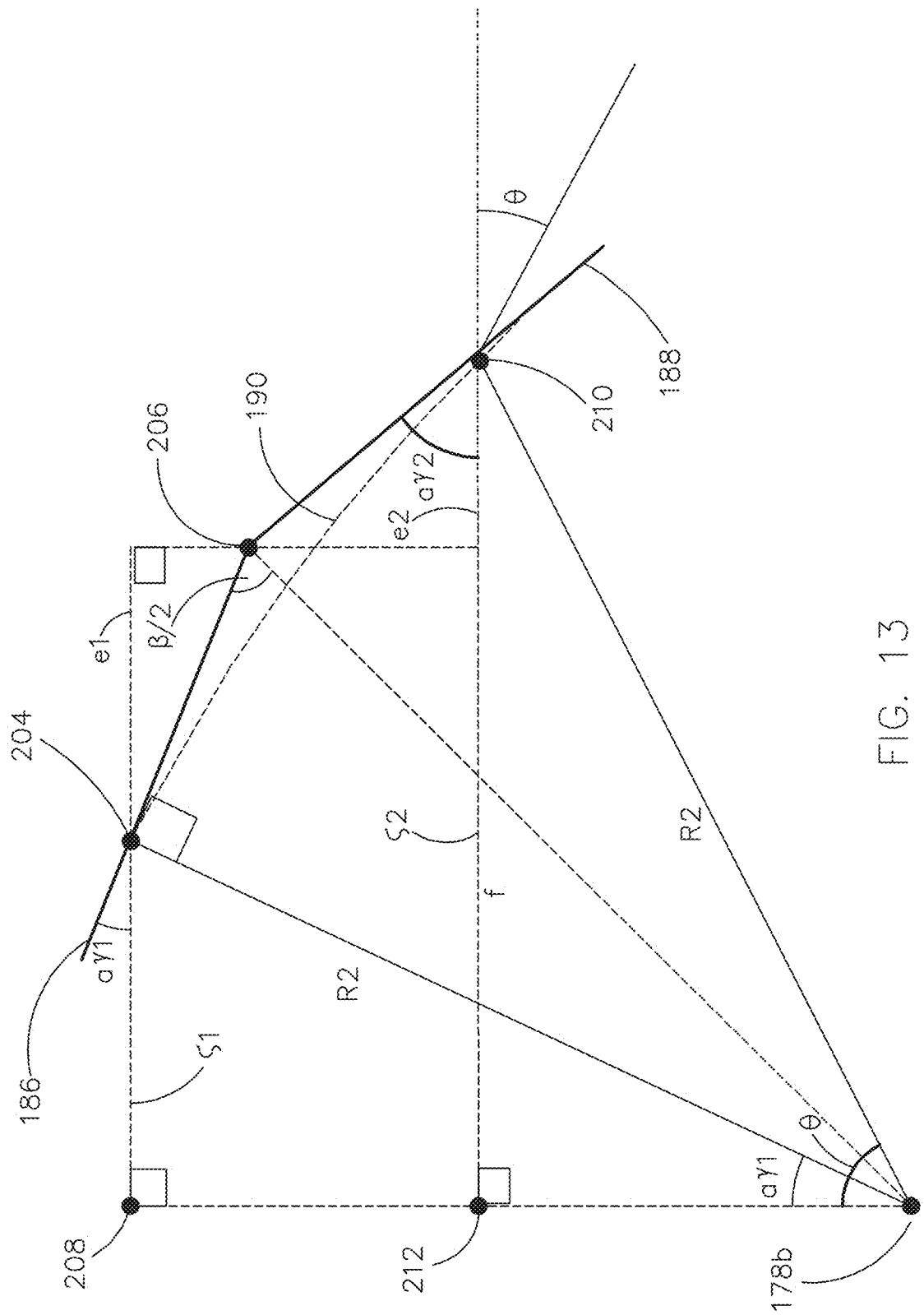
FIG. 13 is an exemplary embodiment of an arc connecting legs of the defined path, according to the inventive concepts disclosed herein.

In an exemplary embodiment, the guidance module 134 may be configured to track the defined path 108 using the curved ground path 104 and a reference point. For example, the guidance module 134 may be configured to track the defined path 104 through an RF leg and RF leg transition. In some embodiments, the RF leg may be associated with the LNAV function (e.g., FIG. 7, below). In other embodiments, the RF leg may be associated with the VNAV function (FIGS. 11-13, below). In yet other embodiments, the RF leg may be associated with both the LNAV and the VNAV function.

Lateral Curves

Figure 7:
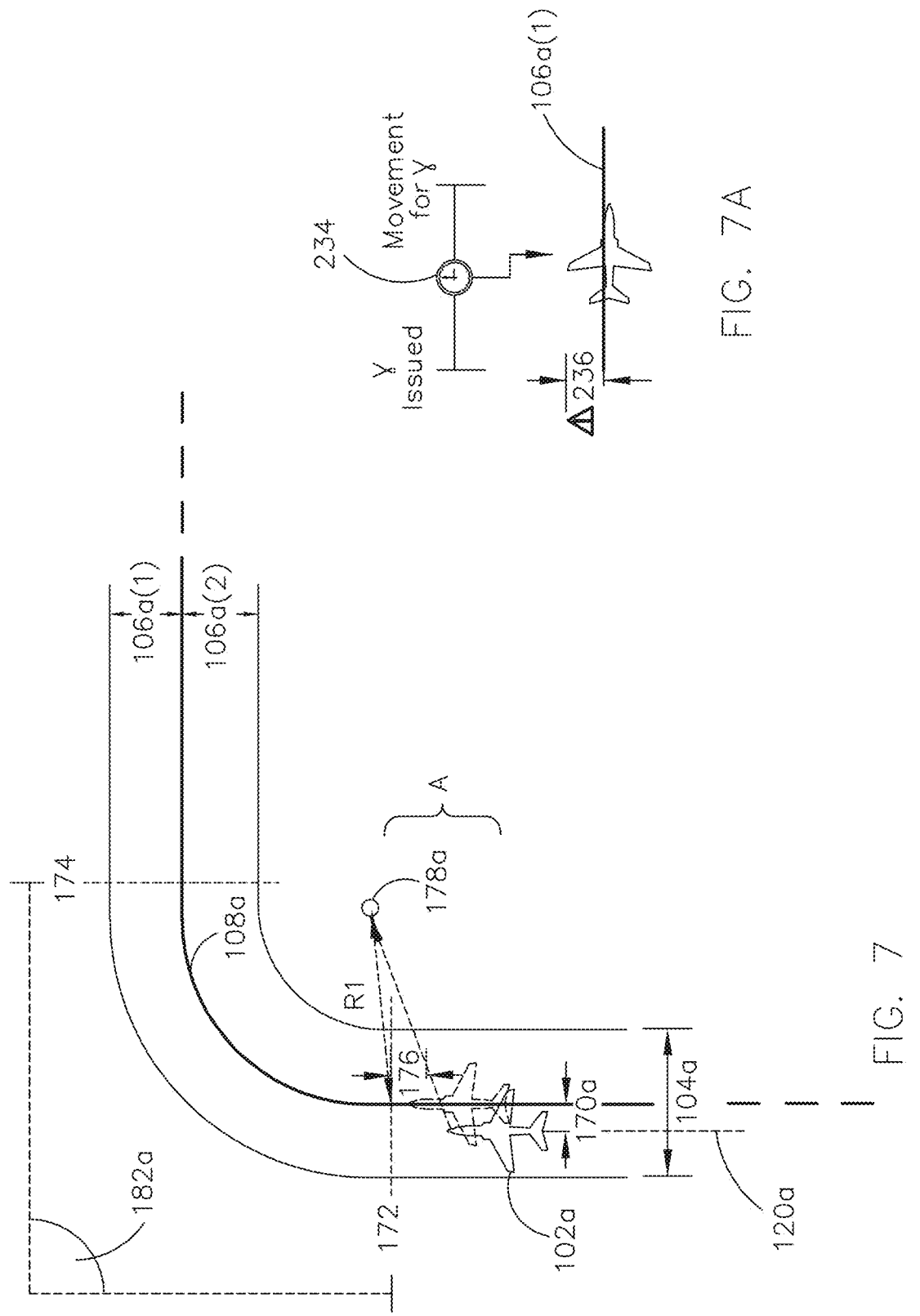
FIG. 7 is an exemplary embodiment of lateral curve, according to the inventive concepts disclosed herein.

Referring now to FIG. 7, the system 100 may be configured to track the defined path 108 through a TF-RF-TF leg sequence (e.g., first Track-to-Fix (TF) leg to second TF leg) using the LNAV function of system 100. The defined path 108 may be tracked according to the first and second lateral thresholds 106a(1) and 106a(2), establishing the desired path 104a, but due to a first one or more deviations 170a, PDE, and/or PSE, the aircraft 102a may be traveling along course 120a.

In an exemplary embodiment, the first and second lateral thresholds 106a(1) and 106a(2) are each twice their respective RNP value (e.g., 2 NM for RNP-1.0) up to a first point 172 (e.g., segment initial fix) and through to a second point 174 (e.g., segment terminating fix), establishing an outer lateral containment region where there is 99.999% probability that TSE resulting from integrity deviations will be within 2×RNP value. In some embodiments, an inner lateral containment region is established where there is 95% probability that TSE resulting from integrity deviations will be within 1×RNP value.

In an exemplary embodiment, multiple containment regions may be defined for the desired path 104 that tracks the defined path 108. For example, a first containment region may be defined by the first threshold 106a(1), the second threshold 106(2), and by the portion of the defined path 108 preceding point 172. By way of another example, a second containment region may be defined by the first threshold 106a(1), the second threshold 106(2), and by the portion of the defined path following point 174. By way of yet another example, a third containment region may be defined by the first threshold 106a(1), the second threshold 106(2), and by the portion of the defined path between points 172 and 174.

In an exemplary embodiment, distances of the first threshold 106a(1) and the second threshold 106a(2) may vary depending on a respective containment region for which they are associated. For example, within the first and second containment regions discussed above, distances associated with the first threshold 106a(1) and the second threshold 106a(2) may be equal for both the first and second containment regions, however, within the third containment region, distances associated with the first threshold 106a(1) and the second threshold 106a(2) may be smaller than the distances associated with the first and second containment regions (e.g., implying a stricter RNP requirement for the third containment region).

In an exemplary embodiment, a pre-roll segment 176 may be defined in order to compensate for one or more control deviations. For example, control commands may be issued, but a delay may exist before movement results from the issued control commands. Thus, a pre-roll segment 176 may be defined during a portion of a TF leg such that the delay is compensated and motion occurs precisely when intended during a succeeding RF leg. In some embodiments, the pre-roll segment 176 is a function of multiple parameters including, but not limited to, turn radius (e.g., R1, below), speed, aircraft dynamics, or combinations thereof. In other words, the pre-roll segment 176 may be a function of BAR. In this regard, the BAR may be a function of wind, turn radius, defined path course at a current aircraft location, true airspeed, and ground speed.

In an exemplary embodiment, during the pre-roll segment 176, an integrity deviation may be used to maintain a threshold (e.g., 106a(1) and/or 106a(2)), while the control deviation may be used by the control system 116 for a control command determination. For example, the PD control module 142a may determine a roll command based on a control deviation determined during the pre-roll segment 176. In some embodiments, outside of the pre-roll segment 176, an integrity deviation may be equivalent to a control deviation.

In an exemplary embodiment, the reference point 178a may coincide with an arc having a first radius to a turn center, R1, and distances from the platform 102a to the reference point 178a may vary depending on a position of the platform 102a relative to the desired path 104a. For instance, if the aircraft 102a is at an outer bound of the defined path 104a, the distance to the reference point 178a may be determined as R1+(2×RNP value). If the aircraft 102a is at the inner bound, then the distance may be R1−(2×RNP value). If the aircraft 102a is at a center of the desired path 104a (i.e., in-line with defined path 108), then the distance to the reference point 178a may be R1. It is noted that the RNP value may depend on the segment of the defined path being traversed. For instance, if the flight segment being traversed is one of the initial, intermediate, and missed approach segments using the LNAV function, then the RNP value may be RNP-1.0; and if the flight segment traversed is the final approach segment, then the RNP value may be RNP-0.3.

Figure 8:
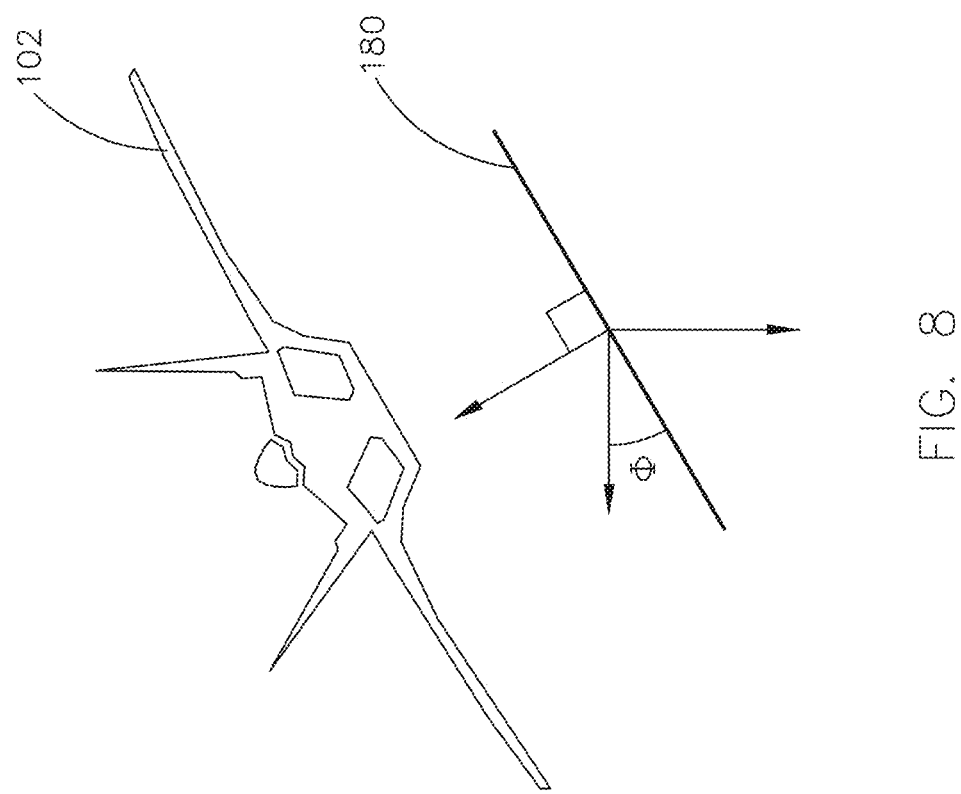
FIG. 8 is an exemplary embodiment of a coordinated turn using enhanced guidance laws and force vectors associated with a platform during the turn, according to the inventive concepts disclosed herein.

In an exemplary embodiment, the reference point 178a may be determined and used by the processor 110 for performing a level and coordinated turn. For example, referring now to FIG. 8, a free-body diagram depicts forces acting on an aircraft during the level and coordinated turn around a turn center point, where a first vector may represent lift, a second vector may represent mass multiplied by centripetal acceleration, a third vector may represent mass multiplied by gravitational forces, with each vector being depicted relative to a portion 180 (e.g., wing) of the platform 102.

Figure 9:
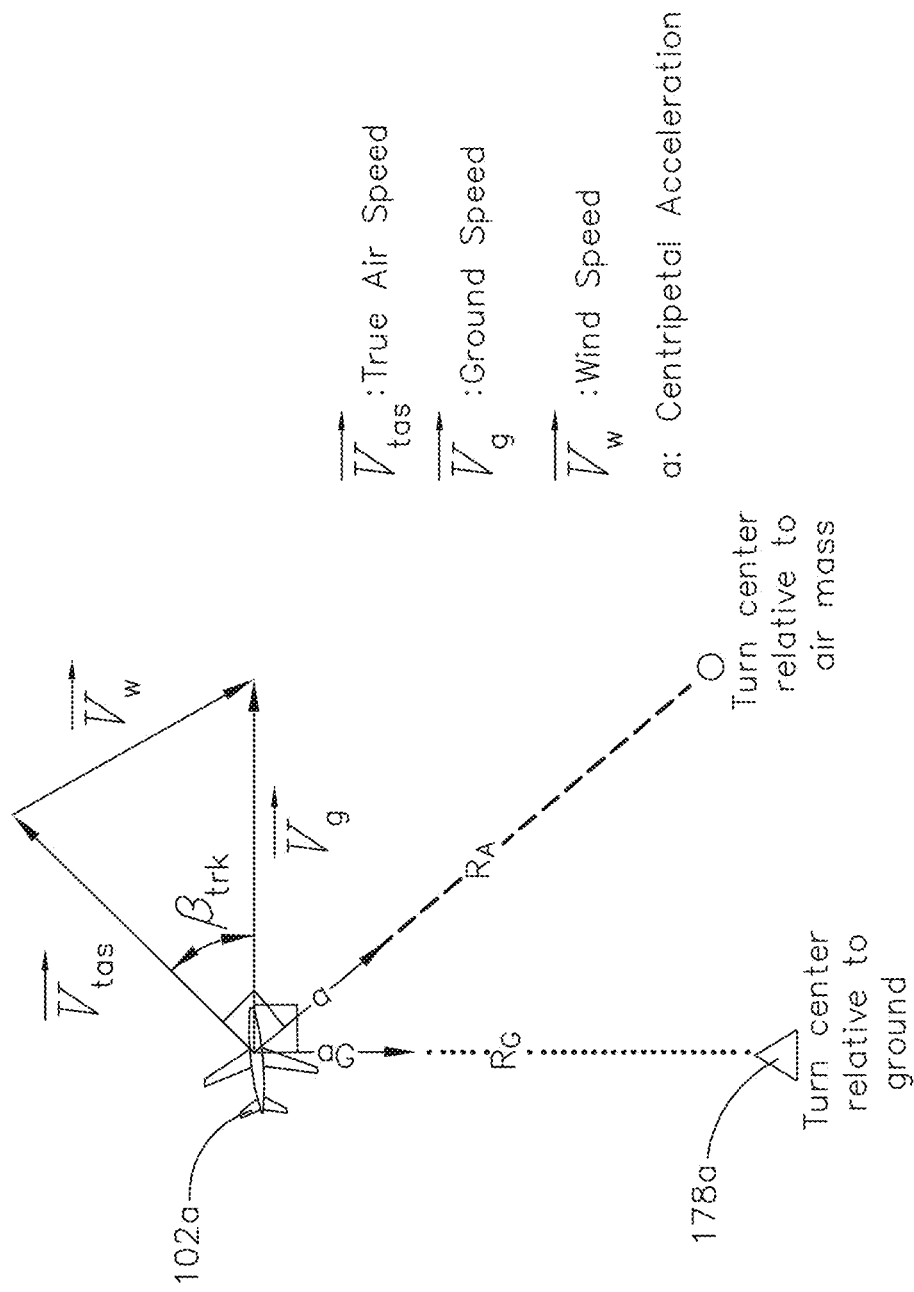
FIG. 9 is an exemplary embodiment of a vector diagram for determining a control command, according to the inventive concepts disclosed herein.

In an exemplary embodiment, control commands determined during a level and coordinated turn are determined relative to a curved ground track. For example, velocity vectors and other parameters used in determining BAR are determined relative to the ground. For instance, referring now to FIG. 9, radius, $R_G$, and acceleration, $a_G$, used in determining BAR are depicted relative to reference point 178a of the curved lateral ground track. In this regard, FIG. 9 depicts these parameters relative to similar parameters used in conventional systems, which determine these similar parameters relative to an air mass.

In an exemplary embodiment, due to the relationship of the velocity vectors, Pythagorean's theorem, the cosine rule, and/or other trigonometric functions, the control parameters for the level and coordinated turn may be determined while accounting for a measured, detected, or otherwise determined first one or more deviations 170a (e.g., lateral drift due to wind). For example, the system 100 may detect a first discontinuity 182a (e.g., FIG. 7) in the flight path, where the first discontinuity 182a may be detected by determining an angular difference between a first leg and a second leg. For instance the angular difference could be represented by the curved portion spanning and interposed between points 172 and 174, and could be determined from input from the NDB. Upon detecting the first discontinuity 182a, the system 100 may be configured to calculate the BAR for a level and coordinated turn using the law of cosines, the velocity vectors of FIG. 9, acceleration, $a_G$, radius $R_G$, and the reference point 178a (e.g., turn center), each of which are relative to the ground, according to the following:

$$\cos(\beta_{trk}) = \frac{(TAS)^2 + (GS)^2 - (W)^2}{2(TAS)GS} \tag{1}$$

$$a_G = a^* \cos(\beta_{trk}) = g_z \tan(\varphi)\cos(\beta_{trk}) \tag{2}$$

$$\omega_G = \frac{GS}{R_G} \tag{3}$$

-continued $$a_G = \frac{(GS)^2}{R_G} = \frac{(R_G \omega_G)^2}{R_G} = R_G \omega_G^2 \quad (4)$$

$$\omega_G^2 = \frac{a_G}{R_G} = \frac{g_z \tan(\varphi) \cos(\beta_{trk})}{R_G} \quad (5)$$

$$\varphi_{bias} = \varphi = \tan^{-1}\left(\frac{(GS)^2}{g_z R_G \cos(\beta_{trk})}\right) \quad (6)$$

where W is the wind speed in knots, TAS is the true airspeed in knots, GS is ground speed of the aircraft (e.g., platform 102a) in knots, $\beta_{trk}$ is a tracking drift angle as depicted in FIG. 9, $R_G$ is R1 and it is the specified turn radius of a circular ground track in NM, $g_z$ is the gravitational force in NM/hr², coy is an angular turn rate along the circular ground track, and $\phi_{bias}$ s the reference roll angle (BAR) in radians for a coordinated turn with level flight to accurately follow the circular ground track (e.g., path 104a).

It is noted that Equation (1) above may be substituted into Equation (6) to compute $\varphi_{bias}$, Equation (5) above may be found by substituting Equation (2) into Equation (4), and Equation (6) may be found by substituting Equation (3) into Equation (5) to eliminate $\omega_G$.

In an exemplary embodiment, Equation (1) is valid for specific conditions. For example, Equation (1) may be valid for wind having directions of $0 < \beta_{trk} < 180$ degrees, because the cosine rule is applicable to triangles. Thus, in some embodiments, a different relationship is defined. For example, the different relationship may be defined where conditions exist with tail wind, with no tail wind, and/or where head wind must be otherwise defined. For instance, when there is no tail wind or there is only tail wind $\beta_{trk}=0$ degrees, and when there is head wind $\beta_{trk}=180$ degrees. Based on the foregoing conditions, the reference roll angle $\phi_{bias}$ (BAR) may be determined according to the following:

$$\varphi_{bias} = \tan^{-1}\left(\frac{(GS)^2}{g_z R_G}\right) \quad (7)$$

LNAV Function

In an exemplary embodiment, the first module 142a of the processor 110 may be configured to determine one or more control commands (e.g., a roll command, etc.) using the LNAV function as follows:

$$\gamma = -K_p * \text{Deviation}_L - K_d * (s * \text{Deviation}_L) + \gamma_{ss} \quad (8)$$

where $K_p$ and $K_d$ are first and second controller gains, $\gamma_{ss}$ is a first steady-state value, s denotes a Laplace operator such as a derivative operation.

In an exemplary embodiment, the lateral deviation in Equation (8) is computed based on a direction of a turn or a direction of the RF leg being performed. For example, the right side of the defined path 108 may remain positive according to the following:

$$\text{Deviation}_L = \begin{cases} \text{TurnRadius} - d_{AC}, & \text{Right Turns} \\ d_{AC} - \text{TurnRadius}, & \text{Left Turns} \end{cases} \quad (9)$$

where $d_{AC}$ is a distance between the actual platform (e.g., aircraft) location and the turn center of a curved ground path.

In some embodiments, the PD controller may be useful to compensate or wash out the first one or more deviations 170a according to a deviation rate such that a reference command (e.g., γ from Equation (8)) eventually converges to a required steady-state value (e.g., $\gamma_{ss}$ from Equation (8)). It is noted that in Equation (8), the term s*Deviation represents the cross track velocity (CTV), which may be determined according to the following:

$$CTV = GPSGS * \sin(TAE) \quad (10)$$

where the term GPSGS is the GPS determined ground speed, TAE is defined as Track Angle Error=VTA−Defined Path Course (e.g., path 108), where within the TAE definition the term VTA is a GPS defined velocity track angle or an IRU defined velocity track angle.

In some embodiments, a filter is used to remove a bias or a noise from the CTV computation of the LNAV function. For example, a GPS VTA used to compute the TAE may be based on the WGS-84 ellipsoidal earth model, while the Defined Path Course may be based on a Spherical Earth Model. Because the two models are different, a resulting TAE may be offset with a first amount of bias. By way of another example, if the VTA used to compute the TAE is received from an Inertial Reference System (IRS) such as an IRU, the resulting TAE may be offset with a second bias or noise. Thus, a filter as shown in FIG. 10A may be used to filter the CTV to remove the unwanted bias.

In an exemplary embodiment, the filter used to filter CTV may need to manage multiple filters, filter one or more signals from different sources, or be configured to compensate for multiple types of bias and/or noise. For example, high-frequency noise/bias resulting from a derivative performed to determine the first one or more deviations 170a (e.g., lateral deviation) may result high-frequency noise that is filtered/compensated by a first low-pass filter. By way of another example, an accelerometer of an IRU may result low-frequency noise that is filtered by a second high-pass filter. Thus, the filter used to filter the CTV may be the notional complementary filter of FIG. 10A, useful in managing multiple (e.g., two or more types of filters (e.g., low-pass filters and high-pass filters).

Figure 10A:
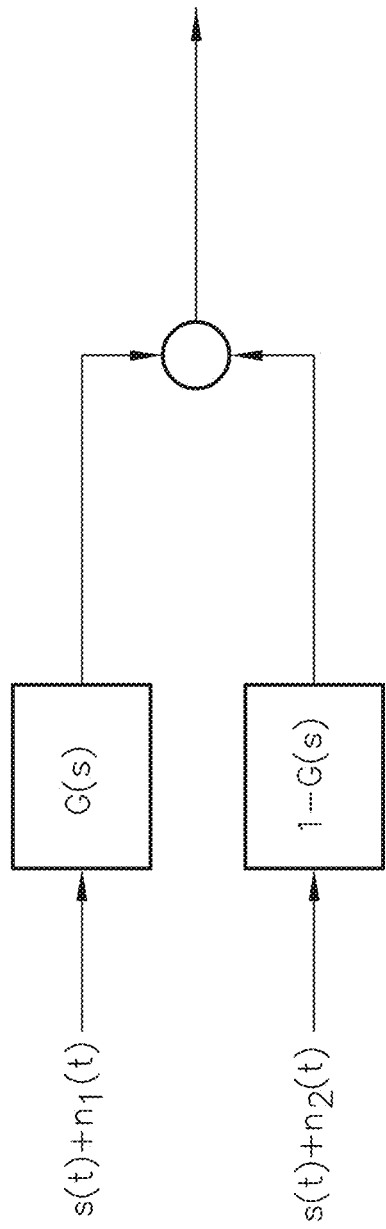
FIGS. 10A and 10B are exemplary embodiments of filters for filtering one or more signals, according to the inventive concepts disclosed herein.

In an exemplary embodiment, an output of the notional complementary filter of FIG. 10A may be obtained according to the following:

$$X(s) = S(s) + N_1(s)G(s) + N_2(s)[1 - G(s)] \quad (11)$$

where G(s) and 1−G(s) represent transfer functions, which do not impact the actual signal. However, these transfer functions are useful in showing how one or more inputs and outputs are related. For example, the two noise inputs, $N_1$ and $N_2$, are modified by the transfer functions G(s) and 1−G(s), respectively, meaning that the two noises, $N_1$ and $N_2$, may have complementary spectral characteristics, such that G(s) can be chosen to mitigate the noise in both inputs. For instance, $N_1$ may be predominantly high-frequency noise from the lateral deviation derivative, whereas $N_2$ may be predominantly low-frequency noise due to the accelerometer.

Figure 10B:
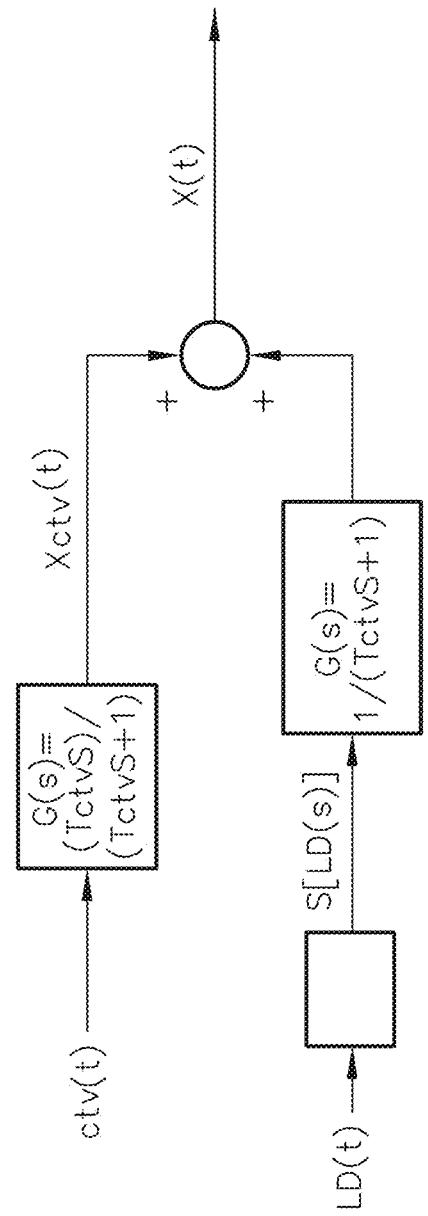

Referring now to FIG. 10B, the transfer functions G(s) may be chosen according to the following:

$$\frac{X_{ctv}(s)}{ctv(s)} = \frac{\tau_{ctv} s}{\tau_{ctv} s + 1} \quad (12)$$

$$\frac{X_{LD}(s)}{LD(s)} = \frac{s}{\tau_{ctv} s + 1} \quad (13)$$

where $\tau_{ctv}$ is a time constant based on the cut-off frequency for the filter. For example, the time constant may be 15 seconds for a cut-off frequency of 0.0667 (i.e., 1/15) radians/sec for a low pass filter. It is noted that other time constants for respective cut-off frequencies are also contemplated by the inventive concepts disclosed herein.

In an exemplary embodiment, two redundant measurements of the same signal may be used by the complementary filter. For example, the first redundant measurement may include CTV from Equation (10), while a second redundant measurement may include a derivative operation used to determine the lateral deviation. In some embodiments, the redundant measurements are input into a complementary filter (e.g., FIG. 10B) to blend the signals and generate an estimate of the actual signal. In other embodiments, the redundant measurements may be input into a Kalman filter, a Wiener filter, or other filters known in the art.

In an exemplary embodiment, a discrete time output of the complementary filter of FIG. 10B may be obtained according to the following:

$$x(t) = x_{ctv}(t) + x_{LD}(t) \tag{14}$$

where $x_{ctv}(t)$ is a first estimated CTV due to the input of ctv(t), $x_{LD}(t)$ is a second estimated CTV due to the input of LD(t), x(t) is the filtered CTV.

In an exemplary embodiment, the one or more transfer functions, G(s) (e.g., Equations (12) and (13)), are used to convert the output of the filter for filtering CTV from the Laplace domain to the discrete time domain.

In an exemplary embodiment, the filtered CTV may then be input into Equation (8). In order to input them into the first module 142a (e.g., input as embedded code into the PD controller) they must first be converted into the discrete time domain. For example, the transfer functions of Equations (12) and (13) are used to convert from the Laplace Domain to the discrete time domain. For instance, equation (13) may be rearranged according to the following:

$$(\tau_{ctv}s + 1)X_{LD}(s) = sLD(s) \tag{15}$$

where Equation (13) may be further manipulated by performing the inverse Laplace transform with all initial conditions set to zero according to the following:

$$\tau_{ctv}sX_{LD}(s) = sLD(s) - X_{LD}(s) \tag{16}$$

$$\dot{x}LD(T) = \frac{1}{\tau_{ctv}}\frac{d(LD(t))}{dt} - \frac{x_{LD}(t)}{\tau_{ctv}}$$

where a numerical integration method (e.g., Euler's method, trapezoidal method, etc.) may be used to re-write Equation (16) in the discrete time domain according to the following:

$$\frac{x_{LD}(k) - x_{LD}(k-1)}{\Delta T} = \frac{LD(k) - LD(k-1)}{\tau_{ctv}\Delta T} - \frac{x_{LD}(k-1)}{\tau_{ctv}} \tag{17}$$

$$x_{LD}(k) = \frac{1}{\tau_{ctv}}(LD(k) - LD - (k-1)) + \left(1 + \frac{\Delta T}{\tau_{ctv}}\right)x_{LD}(k-1)$$

where $\Delta T$ is proportional to the rate at which the LNAV function is run, and k is a time step index that is specific to a particular flight leg sequence. For example, with respect to $\Delta T$, if the LNAV function is run at a rate of 10 Hz, then $\Delta T$ may be 0.1 seconds, and if the LNAV function is run at 60 MHz, then $\Delta T$ may be $6*10^{-7}$ seconds.

In an exemplary embodiment, Equation (12) is manipulated similarly to Equation (13). For example, Equation (12) may be manipulated according to the following:

$$(\tau_{ctv}s + 1)X_{ctv}(s) = \tau_{ctv}s(ctv(s)) \tag{18}$$

$$\dot{x}_{ctv} = \frac{d(ctv(t))}{dt} - \frac{x_{ctv}(t)}{\tau_{ctv}}$$

$$x_{LD}(k) = ctv(k) - ctv(k-1) + \left(1 - \frac{\Delta T}{\tau_{ctv}}\right)x_{ctv}(k-1)$$

where Equations (14), (17), and (18) may be used to determine the filtered CTV in the discrete time domain according to the following:

$$x(k) = x_{ctv}(k) + x_{LD}(k) = = \left(1 - \frac{\Delta T}{\tau_{ctv}}\right)(x_{ctv}(k-1) + x_{LD}(k-1)) + \tag{19}$$

$$\frac{1}{\tau_{ctv}}(LD(k) - LD(k-1)) + ctv(k) - ctv(k-1) =$$

$$\left(1 - \frac{\Delta T}{\tau_{ctv}}\right)x(k-1) + \frac{1}{\tau_{ctv}}(LD(k) - LD(k-1)) + ctv(k) - ctv(k-1)$$

It is noted that Equation (19) may be used to compute the filtered CTV in the discrete time domain, where x(k) is the filtered CTV at a time step k within a particular leg sequence. It is further noted that in the derivation of Equation (19) x(t) is assumed to be in units of meters per second (m/s), ctv(t) is in m/s, and LD(t) is in meters. The use of these units is not meant to be limiting, and other units may be used together with proper unit conversions.

Leg Transitions

In an exemplary embodiment, the first module 142a and/or the second module 142b of processor 110 may reset a value of the CTV. For example, the TAE used to compute ctv(k) may experience a larger error than normal due to the platform 102 transitioning from a first leg to a second leg. In order to compensate for the large amount of error, at the beginning of a newly sequenced flight leg, the filtered CTV, x(k), may be reset to capture the jump in TAE. For instance, at the beginning of a second flight leg sequence at an initial time step k, the filtered CTV, x(k), may be computed according to the following, instead of using Equation (19):

$$x(k) = ctv(k) \tag{20}$$

Vertical Curves

Referring now to FIG. 11, the system 100 may be configured to track movement of the platform 102b along the defined path 108b and through a RF leg transition using the VNAV function of system 100. The defined path 108b may be tracked according to the first and second vertical thresholds 106b(1) and 106b(2), establishing the desired path 104b, but due to a second one or more deviations 170b (e.g., from disturbances due to wind, PDE, and/or PSE), the aircraft 102 may be traveling along course 120b. In an exemplary embodiment, the first and second vertical thresholds 106b(1) and 106b(2) are each approximately 500 ft. (153 m), establishing a first vertical containment region where there is 99.7% probability that TSE resulting from vertical deviations will be within the RNP value. It is noted that the first vertical containment region may be applicable for any path segment that is not a Final Approach Segment (FAS). During the FAS, the first and second vertical thresholds 106b(1) and 106b(2) may be 75 ft. (23 m), establishing a second vertical containment region.

In an exemplary embodiment, the reference point 178b may coincide with an arc having a second radius, R2, and distances from the platform 102b to the reference point 178b may vary depending on a position of the platform 102b relative to the desired path 104b.

In an exemplary embodiment, the system 100 may determine a second discontinuity 182b (e.g., vertical transition between level flight to descent) in the defined path 108b. Upon determining the second discontinuity 182b, the system 100 may determine the top of descent (TOD) point 184 (FIG. 12) and/or the reference point 178b for performing the transition from the level path (e.g., cruise or Altitude Hold Mode) to the descent (e.g., Descent Mode). For example, referring now to FIGS. 11 and 12, a vertical discontinuity 182b may exist between a first leg 186 and a second leg 188. Rather than determining control parameters relative to the first leg 186 or the second leg 188 to transition from the first leg 186 to the second leg 188, control parameters may be determined relative to an arc 190 that connects the first leg 186 with the second leg 188 and relative to a reference point 178b of the arc 190. Further, multiple modes of the multi-mode controller (e.g., control system 116), may be utilized to smoothly transition between the first leg 186 and the second leg 188.

In an exemplary embodiment, the multiple guidance modes of the multi-mode controller 116 include, but are not limited to, a Lateral Path (LPATH) Mode, a Vertical Path (VPATH) Mode, a Descent Mode, an Altitude Hold Mode 192, a Capture Mode 194, a Transition to Track Mode 196, and a Track Mode 198. One or more of the multiple modes may be utilized by the multi-mode controller to conduct navigational guidance for different segments of the defined path 108. For example, the different segments may include different flight phases such as Cruise, Descent, and Approach, where these phases may have separate sub-phases (e.g., Final Approach).

In an exemplary embodiment, the radius R2 of the arc 190 may be determined according to the following:

$$R2 = \frac{TAS^2}{G1} \quad (21)$$

where TAS is the true airspeed in knots and G1 is a specified g-force experienced during a Capture Mode 194 maneuver. In some embodiments, G1 is a first user-defined parameter ranging from 0.05 g to 0.1 g. In yet other embodiments, an actual value of the g-forces experienced may be higher than a defined parameter (e.g., G1) due to wind forces.

VNAV Function

In an exemplary embodiment, the second module 142b of the processor 110 may be configured to determine one or more control commands (e.g., the delta FPA command, a pitch command, etc.) using the VNAV function as follows:

$$\Delta\gamma = \frac{-K_p * Deviation_V - K_i * \left(\frac{Deviation_V}{s}\right) - \gamma_{VAD}}{\max(V_g, \min\_V_g)} \quad (22)$$

where $K_p$ and $K_i$ are controller gains, $\gamma_{VAD}$ is a vertical acceleration detection, and 1/s denotes a Laplace operator such as an integral operation, and Deviation$_V$ is the vertical deviation rate. It is noted that the term $\gamma_{VAD}$ of Equation (22) is only used in the Track Mode 198 of the control system 116, and is useful for detecting and compensating for sudden vertical movement induced by deployment of aircraft control surfaces. This sudden deployment can increase the second one or more deviations 170b, and is therefore accounted and compensated for in Equation (22).

In an exemplary embodiment, the PI controller may use linearized input and may be useful to eliminate an offset from the second one or more deviations such that a command from reference signal 128 (e.g., $\Delta\gamma$ from Equation (22)) eventually converges to a required steady-state value (e.g., $\gamma_{VAD}$ from Equation (22)). It is noted that in Equation (22), the term $$\frac{Deviation_V}{s}$$

represents the vertical deviation (VD) (e.g., 170b), which is in nautical miles (NM). It is further noted that in conventional systems, a filter is used to compensate for a large discontinuity once the descent path has been captured. For example, a low-pass filter (LPF) may be used for VNAV in conventional systems according to the following:

$$\Delta\gamma = \frac{LPF(-K_i * VD - K_p * VDR)}{\max(V_g, \min\_V_g)} \quad (23)$$

$$VD = alt_{current} - alt_{planned} \quad (24)$$

$$VDR = V_s - V_{s\_planned} \quad (25)$$

where $K_p$ and $K_i$ are controller gains (e.g., $K_i$=180 hr$^{-1}$ and $K_p$=1.0), LPF is the low-pass filter operation (e.g., $\tau$ of 20 seconds), VD is vertical deviation in NM, $V_g$ is ground speed in knots, alt$_{current}$ is the current altitude of the platform 102b (e.g., aircraft) in NM, alt$_{planned}$ is the planned altitude in NM, $V_s$ is the current vertical speed of the platform 102b in knots, and $V_{s\_planned}$ is the planned vertical speed in knots.

In conventional systems, the VNAV function of Equation (23) uses the LPF operation to account for a large vertical deviation as the function transitions between the Altitude Hold Mode 192 to the Capture Mode 194. In exemplary embodiments, using the enhanced guidance laws disclosed herein, the large vertical deviation is avoided, negating the need for the LPF operation of the conventional systems (e.g., as shown in Equation (22) above). For example, the large vertical deviation may be avoided by calculating the second one or more deviations 170b relative to the arc 190, as discussed with respect to Equation (21) above.

Altitude Hold Mode

In an exemplary embodiment, the system 100 performs level flight in the Altitude Hold Mode 192. During the Altitude Hold Mode 192, the ΔFPA may be determined according to the following:

$$\Delta\gamma = \frac{(-K_i * VD - K_p * VDR)}{\max(V_g, \min\_V_g)} \quad (26)$$

where VDR is the vertical deviation rate in knots, VD is a vertical deviation (e.g., second one or more deviations 170b) in NM, $K_i$ ranges from 810 hr$^{-1}$ to 180 hr$^{-1}$, $K_p$ is 0.8, $V_g$ is the ground speed in knots, and min_Vg is the specified minimum ground speed in knots.

Capture Mode

In an exemplary embodiment, the system 100 transitions from the Altitude Hold Mode 192 to the Capture Mode 194. For example, the transition may occur upon detecting a FPA change, such as the deviation 170b, above an Altitude Mode threshold, where the threshold may be ΔFPA to be greater than a specific value. For instance, for a two degree)(2° ΔFPA, a transition may occur. In contrast, a conventional system may enter Capture Mode upon detecting a 250-500 ft. (76-153 m) deviation from a descent leg, which results in a large vertical deviation on a flight display before the transition.

Referring now to FIGS. 12-13, the system 100 begins the transition to Capture Mode 194 relative to a beginning point 204 of the arc 190, interposed between, spanning, or connecting two different legs (e.g., third TF leg and fourth TF leg) of the defined path 108.

In an exemplary embodiment, in order to determine point 204, the second discontinuity 182b or angle between flight legs in a flight path (e.g., defined path 108b) may be detected and determined according to the following:

$$\beta = \pi - |\gamma_1 - \gamma_2| \quad (27)$$

where $\gamma_1$ is the FPA of the first leg 186 and $\gamma_2$ is the FPA of the second leg 188 (e.g., where first leg 186 and second leg 188 may be juxtaposed portions of the defined path 108). If the second discontinuity 182b is vertical and is above the Altitude Hold threshold, then the system 100 may enter Capture Mode 194. In some embodiments, the discontinuity 182b is converted from radians to degrees.

Referring now to FIG. 13, using the radius, R2, and the second discontinuity angle, B (from Equation (27)), a distance from the TOD 206 to beginning point, or first tangent point, T1 204 of the arc 190 may be determined according to the following:

$$\text{distance}(T_1, TOD) = \frac{R2}{\tan\left(\frac{\beta}{2}\right)} \quad (28)$$

In an exemplary embodiment, a planned descent speed, $V_{s\_planned}$, corresponding to the current aircraft 102b location on the vertical arc 190 may be determined according to the following:

$$V_{s\_planned} = V_g * \tan(\theta) \quad (29)$$

where theta, θ, may be determined according to the following:
If $|\gamma_1| < |\gamma_2|$ (see, e.g., FIG. 13),
Step 1: calculate a distance ζ between point 208 and point T1 204 according to the following:

$$\zeta = R2 * \sin(a\gamma_1) \quad (30)$$

where $a\gamma_1 = |\gamma_1|$.
Step 2: calculate horizontal distance, e, between point 206 and point 204 according to the following:

$$e = d * \cos(a\gamma_1) \quad (31)$$

where d in Equation (31) is the distance calculated from Equation (28).
Step 3: assign proper sign according to the following:

$$\text{Capture}_{Sign} = 1$$

Else if $|\gamma_1| > |\gamma_2|$

Step 1: calculate a distance ζ between point 208 and point T2 210 (e.g., second arc tangent point coinciding with second leg) according to the following:

$$\zeta = R2 * \sin(a\gamma_2) \quad (32)$$

where $a\gamma_2 = |\gamma_2|$.
Step 2: calculate distance, e, between point 210 and point 206 according to the following:

$$e = d * \cos(a\gamma_1) \quad (33)$$

where d in Equation (33) is the distance calculated from Equation (28).
Step 3: assign proper sign according to the following:

$$\text{Capture}_{Sign} = -1$$

end if
Step 4: determine horizontal distance from point 208 to last waypoint on flight path (e.g., point 202 of FIG. 12) according to the following:

$$d_{208}{}^{end} = d_{206}{}^{end} + \text{Capture}_{Sign} * (e + \zeta) \quad (34)$$

where $d_{206}{}^{end}$ is the horizontal distance from point 206 to the last waypoint on the flight path (e.g., point 202).
Step 5: determine the distance between point 212 and the aircraft 102b according to the following:

$$f = \text{Capture}_{Sign} * (d_{208}{}^{end} - d_{aircraft}{}^{end}) \quad (35)$$

where $d_{aircraft}{}^{end}$ is the horizontal distance from the aircraft 102b to the last waypoint on the flight path (e.g., point 202).
Step 6: calculate the vertical distance from reference point 178b to point 212 according to the following:

$$\text{distance}(212, 178_b) = \sqrt{R^2 - f^2} \quad (36)$$

Step 7: determine the planned vertical speed, $V_{s\_planned}$, using the distance from Equation (36) is the following:

$$V_{s_{planned}} = \frac{-V_g * f}{\text{distance}(212, 178_b)}$$

In some embodiments, a planned altitude, $alt_{planned}$, along the arc 190 may be determined. For example, the planned altitude may be determined as additional steps after Step 7 above, according to the following:
Step 8: determine altitude at the reference point 178b of the arc 190 according to the following:

$$alt_{178b} = alt_{206} + \text{Capture}_{Sign} * (e * \tan(\gamma) - R * \cos(\gamma)) \quad (37)$$

$$\gamma = \begin{cases} a\gamma_1, & \text{when } |\gamma_1| < |\gamma_2| \\ a\gamma_2, & \text{when } |\gamma_1| > |\gamma_2| \end{cases}$$

where, $alt_{206}$ is the altitude at point 206 or the TOD.
Step 9: solve for the planned altitude, $alt_{planned}$, according to the following:

$$alt_{planned} = alt_{178b} + \text{Capture}_{Sign} * \text{distance}(212, 178_b) \quad (38)$$

Transition to Track Mode

In an exemplary embodiment, the system 100 switches from the Capture Mode 194 to the Transition to Track Mode 196. Operating in the Transition to Track Mode 196 may include using a low-pass filter to fade or blend bias as the system 100 transitions from the Capture Mode 194 to the Track Mode 196. For example, a bias associated with a FPA command determined at the end of the Capture Mode 194, may be faded or blended with a FPA command computed by system 100 at the beginning of the Track Mode 196. For instance, the low-pass filter in the Transition to Track Mode 196 may be initialized with bias according to the following:

$$\Delta\gamma_{cap2trk}(0)=\Delta\gamma_{trk}-\Delta\gamma_{cap} \tag{39}$$

where $\Delta\gamma_{trk}$ is the ΔFPA command computed with the VNAV function at the beginning of the Track Mode 196, and $\Delta\gamma_{cap}$ is the ΔFPA command computed with the VNAV function at the end of the Capture Mode 194.

In an exemplary embodiment, the ΔFPA command is determined in the Transition to Track Mode 196 after initialization according to the following:

$$\Delta\gamma_{cap2trk}(t)=LPF(\Delta\gamma_{cap2trk}(t-1))$$

$$\Delta\gamma(t)=\Delta\gamma_{trk}(t)-\Delta\gamma_{cap2trk}(t) \tag{40}$$

where the LPF has a time constant, τ, ranging from three to eight seconds. For example, the time constant, τ, may be seven seconds.

Track Mode

In an exemplary embodiment, the system 100 switches from the Transition to Track Mode 196 to the Track Mode 198. Operating in the Track Mode 198 may include accurately tracking or following the descent path (e.g., leg 188). During the Track Mode 198, the ΔFPA may be determined according to the following:

$$\Delta\gamma = \frac{(-K_i * VD - K_p * VDR - VAD)}{\max(V_g, \min\_V_g)} \tag{41}$$

$$VAD = LPF(1.5 * VA + VDR)$$

where VA is the vertical acceleration in ft./s², which may be converted to knots (e.g., divide by 6076.11), VDR is the vertical deviation rate in knots (e.g., VDR=actual vertical speed−defined vertical speed), VD is a vertical deviation (e.g., second one or more deviations 168b) in NM, $K_i$ ranges from 810 hr$^{-1}$ to 180 hr$^{-1}$, $K_p$ is 0.8, $V_g$ is the ground speed in knots, and min_Vg is the specified minimum ground speed in knots. It is noted that the VNAV function uses the VAD term to compensate for sudden vertical movement induced by deployment of control surfaces via the low-pass filter (LPF), where the LPF has a time constant ranging from four to seven seconds. For example, the time constant may be four seconds.

In an exemplary embodiment, a Track Mode threshold may be set such that a detected FPA discontinuity during the Track Mode 198 that is greater than the Track Mode threshold results in a determination of a control command relative to the arc 190 and a determination of planned descent rate and altitude according to the Capture Mode 194 of system 100. In an exemplary embodiment, the Track Mode threshold ranges from 0.5 degrees FPA discontinuity to 1.5 degree discontinuity. For example, the Track Mode threshold may be 0.8 degrees FPA discontinuity for determining vertical deviation relative to a vertical arc (e.g., arc 190) as opposed to determining vertical deviation relative to a flight leg (e.g., conventional systems determine the deviations relative to the flight legs throughout the entire Track Mode 198).

Figure 14:
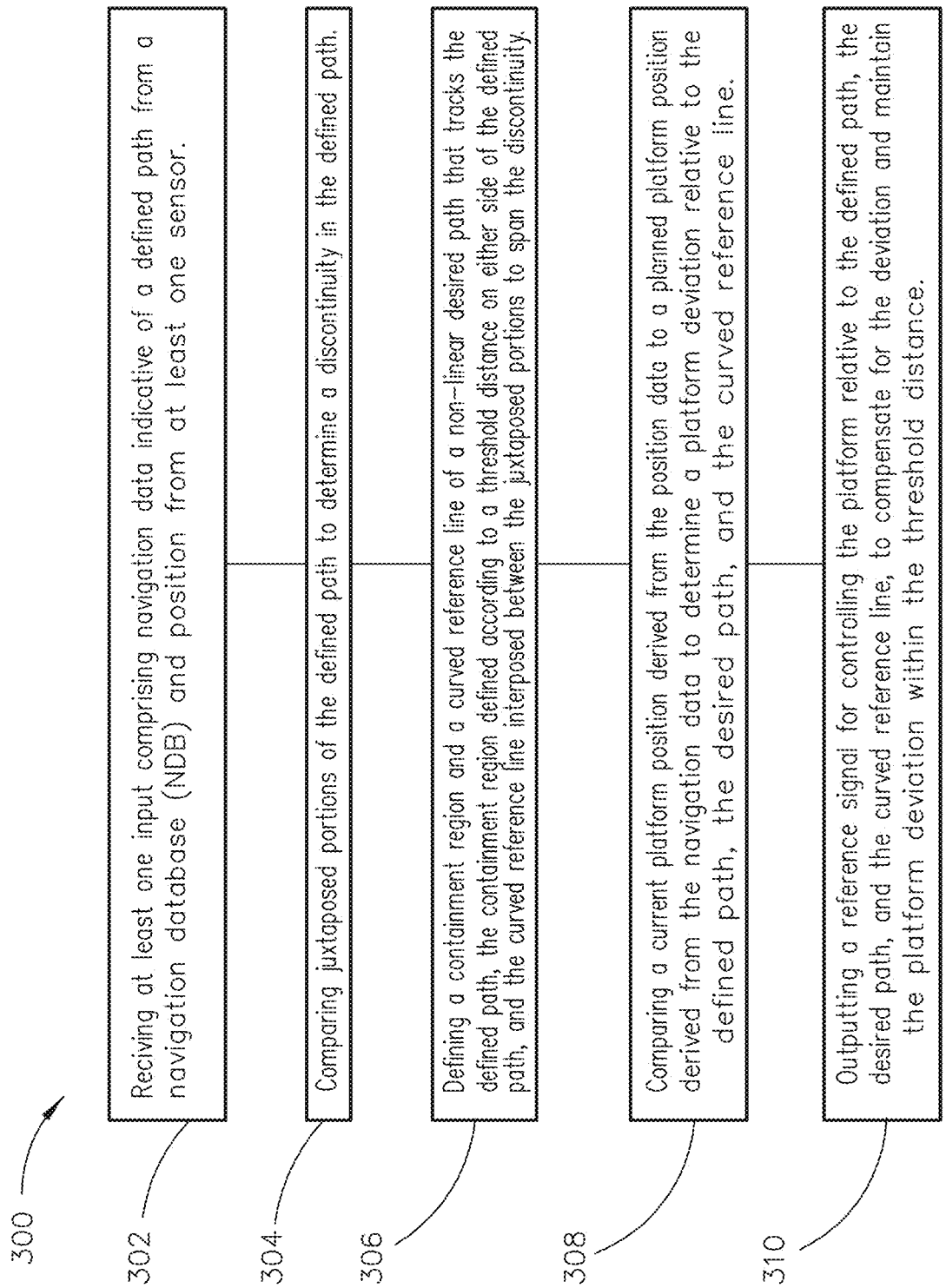
FIG. 14 is an exemplary embodiment of a method for navigational guidance using enhanced guidance laws, according to the inventive concepts disclosed herein.

Referring now to FIG. 14 an exemplary embodiment of a method 300 according to the inventive concepts disclosed herein may include one or more of the following steps. For example, the method 300 may be a method for determining a navigational solution using enhanced guidance laws.

A step 302 may include receiving, via a processor, at least one input comprising navigation data indicative of a defined path from a navigation database (NDB) and position data from at least one sensor. In some embodiments, the processor is one of multiple processors of a navigational guidance computer, the position data includes a current platform position, and the navigational data includes a planned platform position with respect to a portion of the defined path being traversed.

A step 304 may include comparing juxtaposed portions of the defined path to determine a discontinuity in the defined path. For example, the discontinuity may be calculated by comparing a first angle of a first flight leg to a second angle of a second flight leg to determine a change in flight path angle. In some embodiments, the discontinuity comprises a lateral discontinuity. In other embodiments, the discontinuity comprises a vertical discontinuity.

A step 306 may include defining, via the processor, a containment region and a curved reference line of a non-linear desired path that tracks the defined path, the containment region defined according to a threshold distance on either side of the defined path, and the curved reference line interposed between the juxtaposed portions to span the discontinuity. For example, the curved reference line may be an arc associated with the non-linear desired path, such as a portion of a circular ground path, and the containment region may be defined according to a first distance between the arc and the defined path and a second distance between the arc and the defined path, where the second distance is greater (e.g., second distance=first distance×two) than the first distance. In this regard, the defined path may be equivalent to a center line of the containment region.

A step 308 may include comparing a current platform position derived from the position data to a planned platform position derived from the navigation data to determine a platform deviation relative to the defined path, the desired path, and the curved reference line.

A step 310 may include outputting a reference signal for controlling the platform relative to the defined path, the desired path, and the curved reference line, to compensate for the deviation and maintain the platform deviation within the threshold distance. For example, the reference signal may be output to a vehicle control system, such as an autopilot or digital engine control, to control or maneuver the vehicle through a curvature of the curved reference line relative to the curved reference line and a reference point or turn center. The vehicle may be controlled or maneuvered while ensuring that platform deviations are maintained within the threshold distance according to one or more degrees of accuracy. In this regard, the one or more degrees of accuracy may be an RNP value from RNP-0.1 to RNP-1.0.

In some embodiments, method 300 may include one or more sub-steps. For example, referring now to FIG. 15, method 300 may include one or more or sub-steps, including but not limited to, 306-1, 308-1, 310-1, 310-2, and 310-3.

A sub-step 306-1 may include determining a radius of a curvature of the curved reference line by selecting a desired g-force associated with maneuvering the platform through the curvature. The selecting may be performed by a user or a manufacturer. For example, the selecting may be via firmware or software embedded in an SOC. By way of another example, the selecting may be via a user interface during real-time operation of the platform.

It is noted that sub-step 306-1, or determining of the radius, may be an important sub-step in method 300. For example, the turn center or reference point for an arc spanning or connecting the discontinuity or FPA of the segments of a flight path may be dependent on the radius selected. In other words, one or more parameters utilized in performing the LNAV Function or the VNAV Function may be dependent on the radius selected. By way of another example, another step dependent on the radius selection may be the Step 308, which may determine the deviation of the platform from the defined path relative to the arc after the radius of the arc is determined.

A sub-step 308-1 may include determining a deviation rate based on the position data received in Step 302. In some embodiments, the deviation rate is determined relative to a non-linear portion of the desired path (e.g., curved reference line or arc). Thus, the deviation rate may be further based on the radius selected in sub-step 306-1, a planned vertical speed of the platform at its current position, and a planned altitude of the platform. In this regard, the planned vertical speed and the planned altitude may be received and/or derived from an NDB or from a flight plan.

The sub-step 308-1 may include determining the deviation rate together with the deviation determined in step 308. For example, during the Capture Mode of the FMS, the deviation and the deviation rate may be based on the radius of the curved vertical ground track. Next, the deviation, the deviation rate, and a planned vertical speed at a current position of the aircraft, may be used to determine a delta flight path angle $\Delta\gamma$ command according to Equations (27) through (38).

By way of another example, the sub-step 308-1 may include determining two or more deviations. For example, the first deviation may be a vertical deviation from a curved vertical ground track, the discontinuity may be a $\Delta$FPA, and legs of the $\Delta$FPA may be connected by an arc proportional to the curved ground track. In this regard, the second deviation may be a lateral deviation from a curved lateral ground track. By way of another example, the step 308 may include determining a control deviation, such that sub-step 308-1 may include determining one or more integrity deviations. In this regard, the step 310 may include using the control deviation as an input into the LNAV function and using the integrity deviation to determine whether the platform deviations are maintained within the threshold distance during controlling or maneuvering the platform through a non-linear portion of the defined path. For instance, the non-linear portion may be a curved lateral ground track with a first ground-based reference point, such that the pre-roll time (e.g. used to account for control deviation) of a pre-roll segment may be determined according to the following:

if $\Delta BAR > 2$ and $\Delta BAR \leq 22$, (42)

$\Gamma = \dfrac{\Delta BAR}{11} + 4.5$ $TD_{TAS}^{max} = 200$ $TD_{TAS}^{min} = 150$ if $V_{TAS} \geq TD_{TAS}^{max}$ $c = 0$ else if $V_{TAS} < TD_{TAS}^{min}$ $c = 6 - \Gamma$ else $c = \dfrac{(6 - \Gamma) * (TD_{TAS}^{max} - V_{TAS})}{TD_{TAS}^{max} - TD_{TAS}^{min}}$ -continued end if $\zeta_{en} = \Gamma + c$ else $\zeta_{en} = P1 + \dfrac{0.75 * \Delta BAR}{P2}$ (43)

end if

If $\zeta_{en} > 8.5$, then $\zeta_{en} = 8.5$ (44)

where $\Delta BAR$ is a difference between a bank angle required (BAR) of a first leg (e.g., next leg) and a BAR of a second leg (e.g., current leg) in units of degrees, $\Gamma$ and $c$ are temporary variables or symbols and $\Gamma$ is in units of seconds, $TD_{TAS}^{max}$ and $TD_{TAS}^{min}$ comprise a velocity threshold in units of knots, $\zeta_{en}$ is the time associated with the pre-roll segment in units of seconds as determined by an enhanced guidance law, and $P_1$ and $P_2$ are platform dependent parameters with $P_1$ being in units of seconds and $P_2$ being in units of degrees per second. For instance, $P_1$ may be proportional to a rate of the processor, such as if the processor is a 10 Hz processor, then $P_1$ may be 1 second, and if the processor is a 60 MHz processor, then $P_1$ may be $6*10^{-6}$. In this regard, $P_2$ may be the nominal roll change rate. For example, $P_2$ may be 3 degrees per second.

It is noted that the pre-roll time determined above is determined with respect to maintaining the integrity deviation determined in sub-step 308-1.

A sub-step 310-1 may include determining the reference signal to include an output that accounts for a special condition, such as wind. Thus, in some embodiments, the reference signal determined in Step 310 may only be output after accounting for the special conditions or circumstances, such as wind. For example, the LNAV function may determine one or more control commands (e.g., a roll command) according to Equations (1) through (19), while accounting for wind (e.g., sub-step 310-1). For example, the BAR or the roll command turn bias, $\phi$, may be determined using Equations (1) through (7) according to the following:

(a) if wind, then $\Delta\psi = \psi_p - \psi_{wind}$ (b) if $\Delta\psi > 180$ degrees $\Delta\psi = 360 - \Delta\psi$ (c) else if $\Delta\psi < -180$ degrees $\Delta\psi = 360 + \Delta\psi$ (d) if $1 < abs(\Delta\psi) < 179$ degrees, then $\Phi = \tan^{-1}\left(\dfrac{2 * TAS * (GS)^3}{g_z R_G * [(TAS)^2 + (GS)^2 - (W)^2]}\right)$ (45)

(e) else $\Phi = \tan^{-1}\left(\dfrac{(GS)^2}{g_z R_G}\right)$ (46)

where $\Delta\psi$ is a track angle difference between a track angle of the platform and a wind vector with direction in units of degrees, the BAR or roll command turn bias, $\phi$, is in radians, GS is a ground speed in knots, $R_G$ is a turn radius of the defined non-linear path relative to ground, $g_z$ is gravitational force in NM/hr$^2$, W is wind speed in knots, TAS is true airspeed in knots, and where (a) above may occur during sub-step 310-1, including accounting for special conditions or circumstances such as wind and (b) may occur during sub-step 310-2, including computing a track angle difference.

It is noted that an assumption is made in determining the BAR or roll command turn bias, $\phi$, in Equations (45) and (46) above. The assumption being made is that the track angle of the aircraft is within a certain set, (e.g., $\psi_{ac} \in [-180, 180)$) and that the direction of the wind vector is within a certain set (e.g., $\psi_{wind} \in [-180, 180)$) with true north being zero (0) degrees. It is further noted that the functions, $\Delta\psi=360-\Delta\psi$ and $\Delta\psi=360-\Delta\psi$ of (a) and (b) above, represent functions to scale the track angle difference to a 180 degree (180°) window.

By way of another example, the sub-steps 310-1 may include accounting for special conditions or circumstances such as compensating, during the Track mode, for one or more deployed control surfaces. For instance, a deployed control surface may be accounted for and a $\Delta$FPA command determined according Equation (41), above.

By way of yet another example, the sub-step 310-1 may include accounting for special conditions by negating, during the Altitude Hold Mode, a need for vertical acceleration detection (VAD), and determining the $\Delta$FPA command according to Equation (26).

A sub-step 310-2 may include filtering a signal associated with at least one of a cross-track velocity, a $\Delta$FPA, a vertical acceleration detection (VAD), and a deviation rate. For example, a bias may be carried from a first $\Delta$FPA determined in a first mode of the FMS to a second mode of the FMS. In the second mode of the FMS, the bias may be filtered to determine a second $\Delta$FPA for the second mode. For instance, the bias may be filtered during the Transition to Track Mode according to Equations (39) through (40).

A sub-step 310-3 may include applying a flag or data bit to enable a determination that the curvature of the curved reference line indicates a right, a left turn, a descent, or an ascent. In this regard, it is noted that a portion of a defined path, such as a turn segment of a flight path, may include two identical but opposite segments. For example, the turn segments of an S-turn may be equal but opposite to each other with respect to one or more directions at which the turn segments are performed. Thus, in some embodiments, calculations or computations are made for a first segment using a first flag or data bit to indicate a first one or more directions. Then, rather than re-compute or re-calculate functions for the second turn segment, the navigational guidance computer may be configured to re-use one or more previous calculations, while applying a second flag or a second data bit to indicate that the one or more previous calculations will apply to a second one or more directions.

In some embodiments, the flag or data bit may indicate a proper sign convention associated with the turn. For instance, when using the LNAV function, one or more equations such as Equation (9) may be applied. By way of another example, sub-step 310-3 may include using the VNAV function and applying Step 3 of one or more of Equations (29)-(33).

Examples

By way of another The following examples are to be considered as illustrative in nature, and are not limiting in any way. The scope of the invention is that which is defined in the claims only.

Flight technical error (FTE) is primarily influenced by the guidance laws in an FMS, auto pilot, and auto-throttle. Therefore, to evaluate the statistical performance of the FTE, a simulation tool was developed to simulate and integrate one or more avionics models that can impact the FTE.

Figure 16:
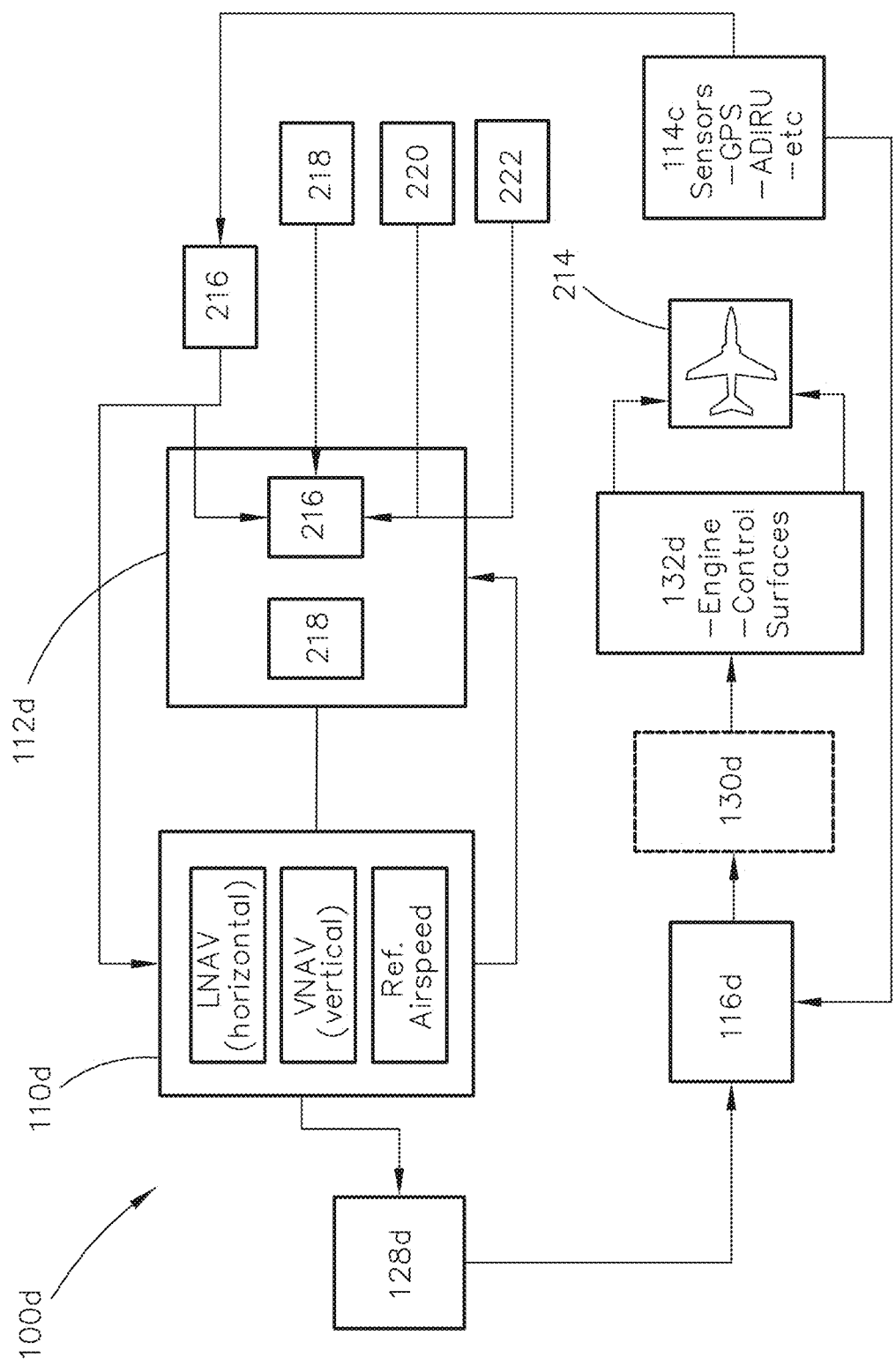
FIG. 16 is an exemplary embodiment of a system with enhanced guidance laws, according to the inventive concepts disclosed herein.

Referring now to FIG. 16, guidance laws for an FMS were implemented as embedded Matlab functions. Matlab/Simulink models for auto pilot and auto-throttle 116*d* were based on production software for Bombardier Global 5000 business jets (a.k.a. M145). In this regard, a six degrees of freedom (DOF) (e.g., three for vertical and three for lateral) model 214 was provided as Simulink S-functions according to the Bombardier Global 5000 business jets.

Monte Carlo simulation was performed for each of the following Examples. In this regard, 100 runs were performed for each Example, where the Monte Carlo test driver called the simulation tool in FIG. 16 for each run. At the end of a run, the Monte Carlo test driver collects the FTE data before terminating the simulation tool, and then the simulation tool is restarted for the next Monte Carlo run. The process is repeated until the test driver has performed the required number of runs for the Monte Carlo test. In some Examples, the simulated performance using enhanced guidance laws is compared and contrasted with simulated performance using legacy or conventional guidance laws.

Example Approach Plan

Figure 17:
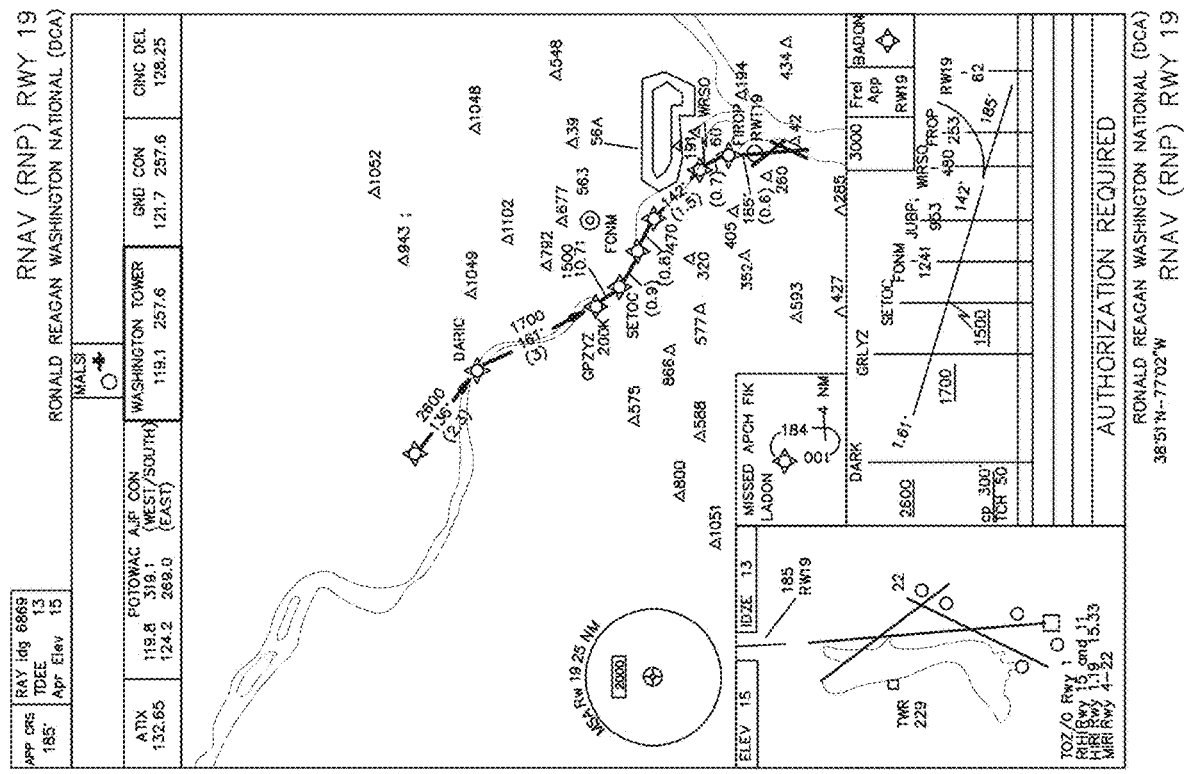
FIG. 17 is an exemplary embodiment of an approach plan, according to the inventive concepts disclosed herein.

By way of another Referring now to FIG. 17, a federal aviation administration (FAA) specified RNP-0.11 approach plan for the KDCA (National Reagan) airport is depicted. The FAA RNP-0.11 approach plan was selected for performing the Monte Carlo tests. The DA for the approach is 491 ft. mean sea level (MSL). This approach plan was read by the Monte Carlo test driver for parsing according to the Hybrid Great Circle method 216 (FIG. 16), to limit the PDE within a world-wide worst case scenario of 10 meters. The Great Circle Method-parsed flight plan is set as the active flight plan 218 to be used by the FMS. The simulated aircraft weight was set to 56,000 pounds. As shown in FIG. 17, there is an S-turn starting about four NM away from the DA location.

Figure 18:
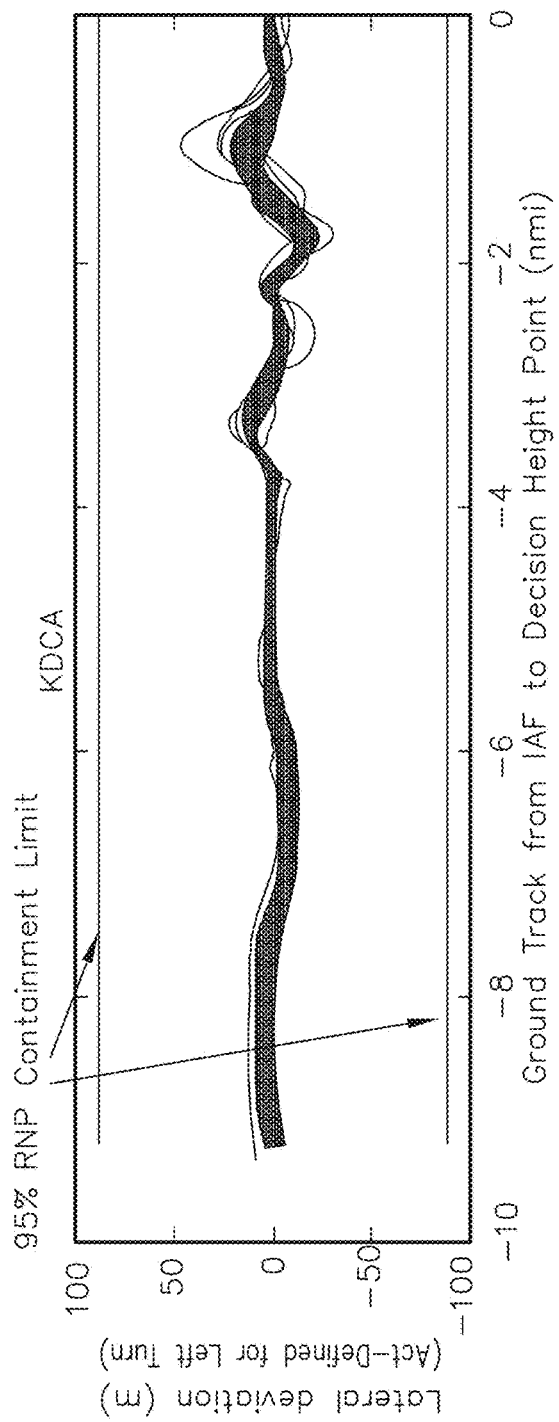
FIG. 18 is an exemplary embodiment of a chart depicting deviations being maintained within a lateral containment region, according to the inventive concepts disclosed herein.
Figure 19:
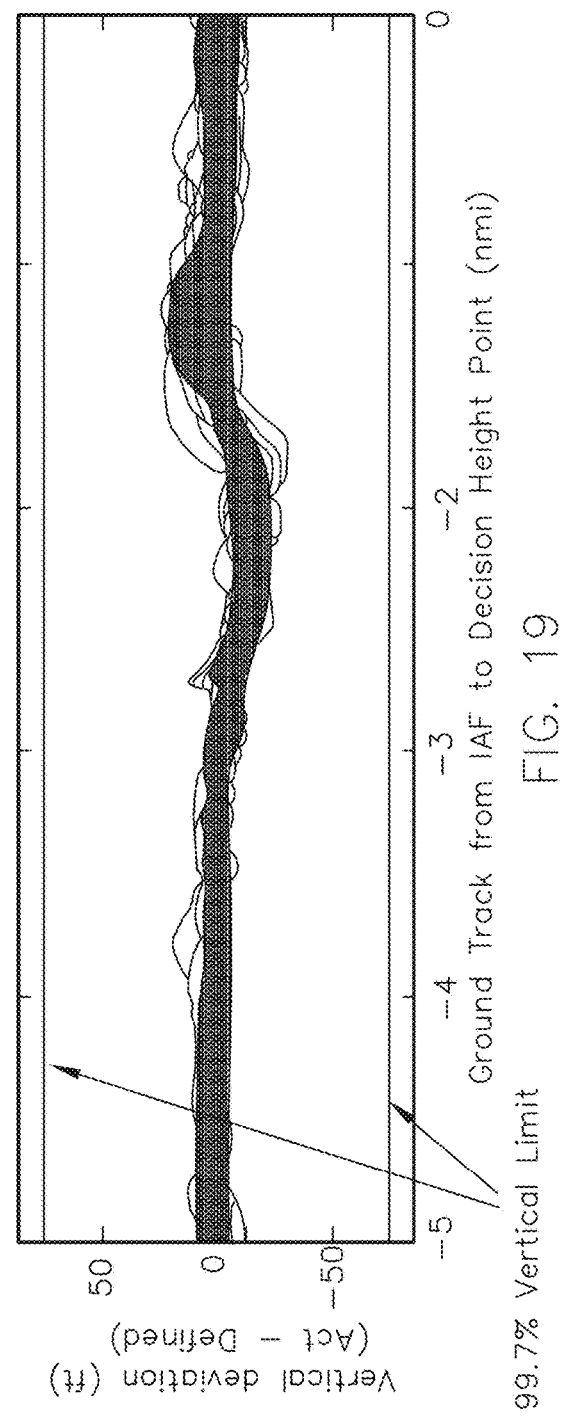
FIG. 19 is an exemplary embodiment of a chart depicting deviations being maintained within a vertical containment region, according to the inventive concepts disclosed herein.

As seen in FIGS. 18 and 19, the lateral and vertical deviations for the Monte Carlo runs using the enhanced guidance laws are within their respective lateral and vertical limits.

As seen in FIGS. 20 and 21, the roll command for the FMS and the actual aircraft roll at the KDCA airport using the enhanced guidance laws are within the limits for the 100 Monte Carlo runs. The S-turn can be seen in the aircraft roll data of FIG. 21. Because the aircraft is gradually reducing its airspeed during the approach segment, the roll angle is not a constant value during the lateral turn. The varying roll angle is needed to compensate for the reducing airspeed for a coordinated turn with a constant turn radius.

Lateral Threshold

By way of another Referring now to FIG. 22, the threshold for the lateral deviation at the 95% probability is set as half of the RNP value for this Example. Therefore, with the RNP value of 0.1 NM and of world-worst PDE of 10 meters, the lateral limit is 87.6 meters (i.e., 0.5*(0.1*1852−10)). This lateral limit of 87.6 meters at the 95% probability is imposed on the approach segment 220 from the Initial Approach Fix (IAF) 222a or 222b to the Decision Altitude (DA) at location 202.

Vertical Threshold

By way of another The vertical threshold for the vertical deviation at 99.7% probability is specified as 75 ft. (23 m) for the precision approach segment 224 from the FAF 226 to the DA 202. In contrast, the vertical threshold for the descent and arrival phases of flight is 500 ft. (153 m).

LNAV Complementary Filter

By way of another In this Example, the filtered cross-track velocity (ctvf) time function (kt) 228 of a conventional or legacy system was plotted against the ground track to end (NM). When plotted, it was observed that the ctvf has a small offset of about 0.42 degrees with relatively small noise (e.g., ctvf fluctuates slightly due to low-frequency noise associated therewith).

In this Example, the CTV of a conventional or legacy system was determined using the lateral derivation (e.g., ctd_dot). When plotted, the output associated with the ctd_dot was observed to have large fluctuation due to the high frequency noise associated therewith as observed against ground track to end (NM).

Figure 23:
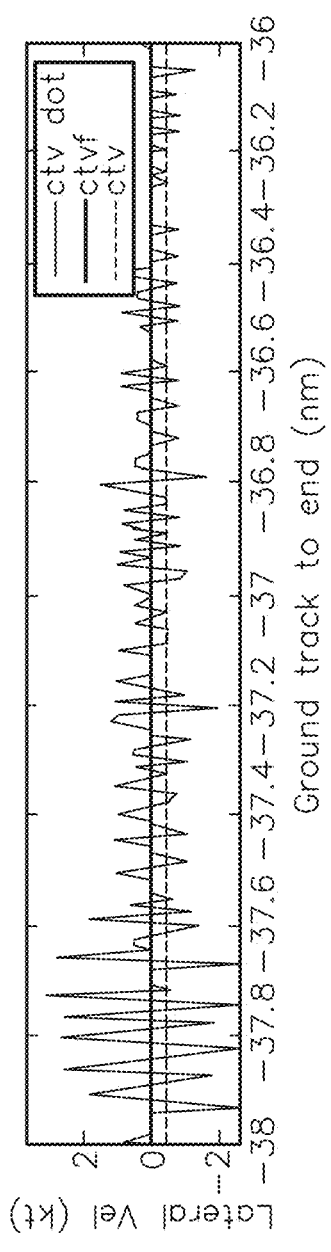
FIG. 23 is an exemplary embodiment of a plot of a cross-track velocity, a filtered cross-track velocity, and a cross-track velocity determined using a derivative function, according to the inventive concepts disclosed herein.

Referring now to FIG. 23, using the enhanced guidance laws discussed herein, the performance of the complementary filter for level and straight flight is depicted, where lateral velocity (kt) is plotted along the y-axis and ground track to end (NM) is plotted along the x-axis. As shown in FIG. 23, the filtered cross-track velocity (ctvf) 228 is seen as zero mean, the cross-track velocity (CTV) 232 is seen with a small bias, and the derivative of the lateral deviation (e.g., ctd_dot) 230 is seen as zero mean with the high frequency noise discussed above.

Figure 24:
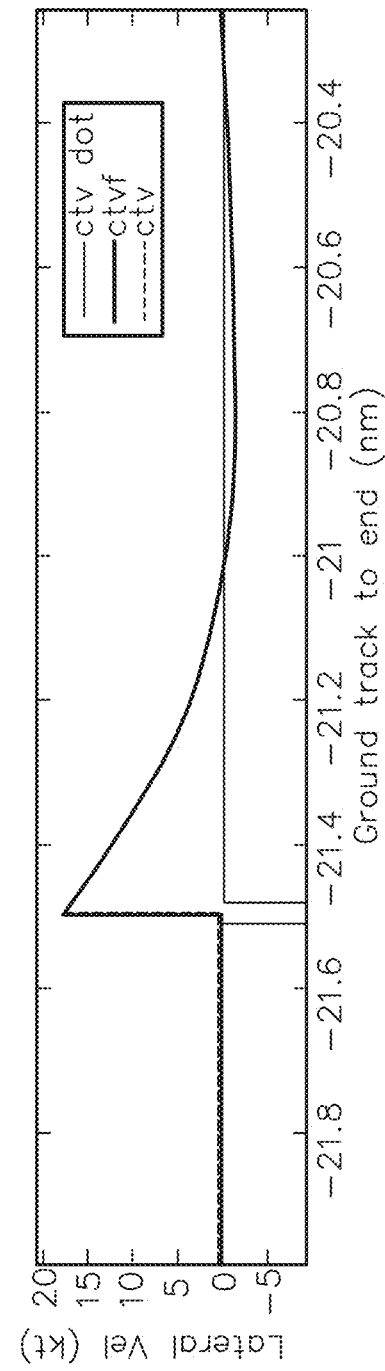
FIG. 24 is an exemplary embodiment of a chart depicting a performance of a complimentary filter, according to the inventive concepts disclosed herein.

Referring now to FIG. 24, using the enhanced guidance laws discussed herein, the performance of the complementary filter for a level flight during a flight leg sequencing from a TF leg to RF leg is depicted. The spike in ctvf on the ground track around −21.5 NM shown in FIG. 24 is a result of the reset of the complementary filter at the beginning of a newly sequenced leg. As observed, the ctvf eventually converges after several time constants of the filter.

ΔBAR and Roll Angle

By way of another As shown in Table 1, below, three different scenarios occurred, where the aircraft was performing a lateral turn with different turn radii for a level flight at the altitude of 10,000 ft. (e.g., 3048 m), and with a Calibrated Air Speed (CAS) of about 250 knots. Design parameters used by control systems to analyze the response of a second order system are listed to compare the three different scenarios. Two of the scenarios are within two bank angle regions and one is outside two bank angle regions, where the two bank angle regions may be defined as regions where if a conventional system were used then a control system pre-roll time, $\zeta_{CS}$, would be inadequate for accurately performing the bank angle (e.g., region (1) ΔBAR>30 degrees because pre-roll time of control systems, $\zeta_{CS}$, is too long, and (2) ΔBAR<17 degrees, because $\zeta_{CS}$, is too short to compensate delay of the aircraft response). For example, in Scenario B the turn radius was about seven NM, the ΔBAR was about 10 degrees, and overshoot of the control system was about 22%; whereas, in Scenario C, the turn radius was about 11 NM, the ΔBAR was about six degrees, and the overshoot was about 31%. Because the step response of a second order system is usually preferred to be around 5%, the results of the different scenarios, such as Scenario A with approximately 5% overshoot, led to the determination of Equations (42) through (44).

Figure 25:
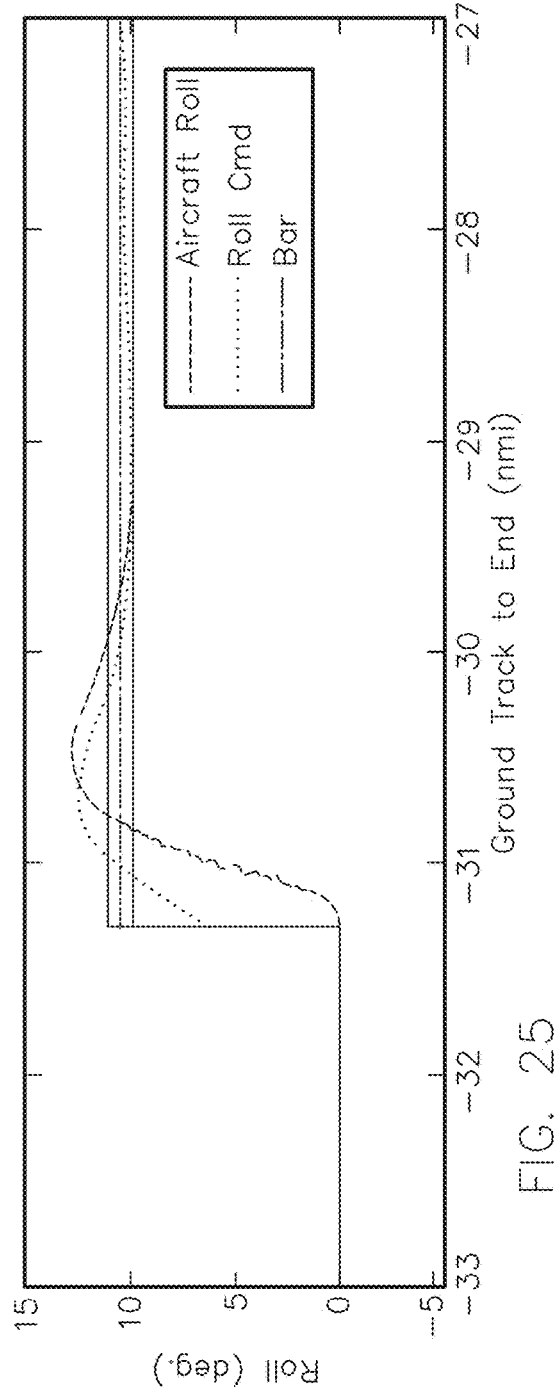
FIG. 25 is a chart depicting aircraft performance, according to one or more conventional systems.
Figure 26:
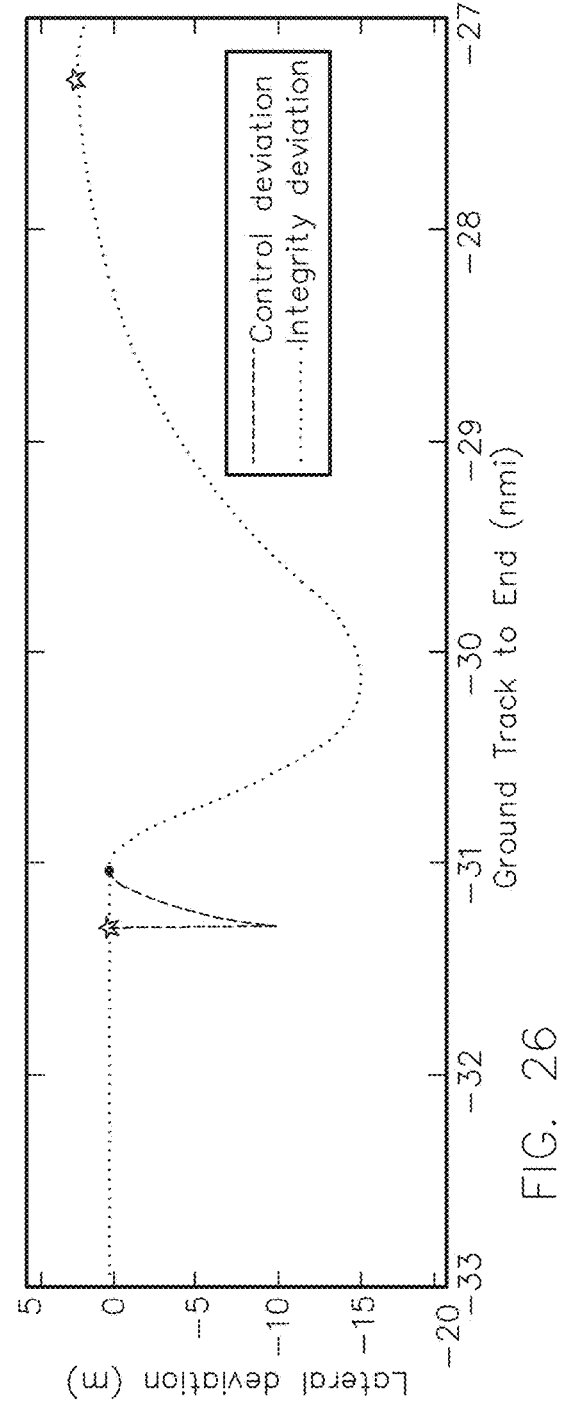
FIG. 26 is a chart depicting control deviations and integrity deviations, according to one or more conventional systems.
Figure 28:
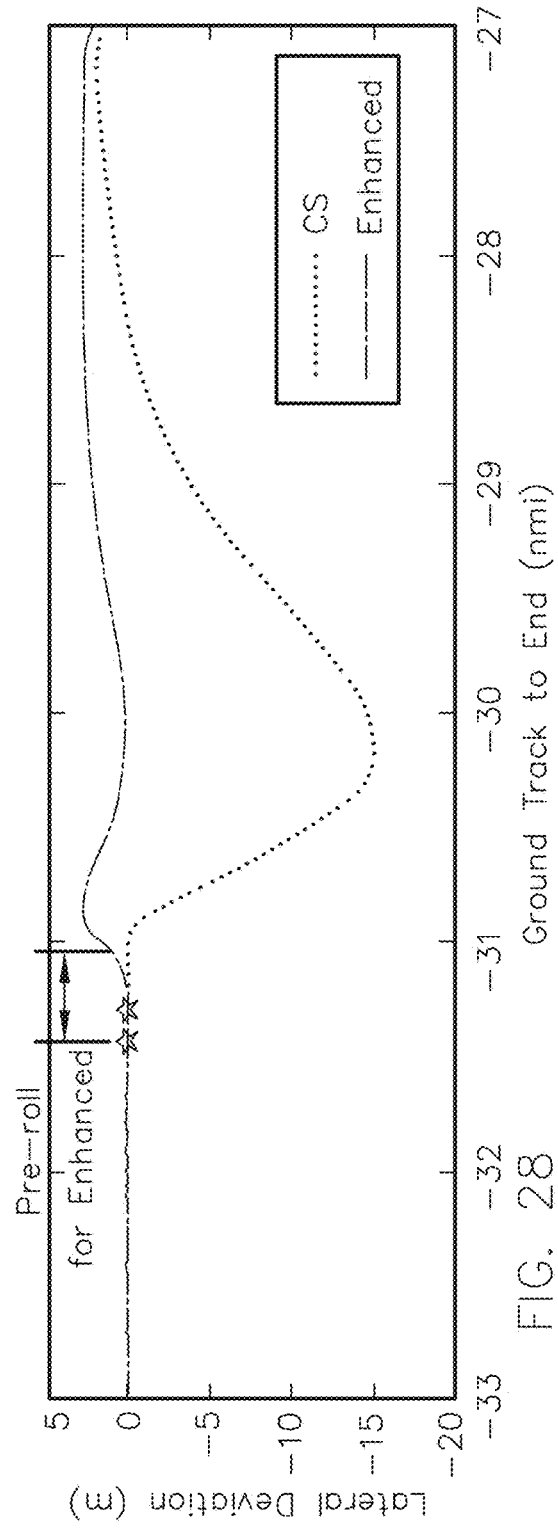
FIG. 28 is an exemplary embodiment of a chart depicting lateral deviations from a defined path, according to the inventive concepts disclosed herein.

The results of Scenario A and Scenario B, using conventional or legacy guidance laws, were plotted in multiple different charts, using roll (degrees) and lateral deviation for the y-axis and Ground Track to End (NM) for the x-axis. The results of Scenario B are depicted in FIGS. 25 and 26. The axes of FIG. 25 are Ground Track to End (NM) vs. roll (deg.); and, the axes of FIG. 26 are Ground Track to End (NM) vs. lateral deviation (meters), where control deviations 234 and integrity deviations 236 are observed in FIG. 26. These control deviations 234 and integrity deviations 236 are also depicted in FIG. 28, for Scenario B using the enhanced guidance laws (see, FIG. 7A).

TABLE 1

|  | Turn Radius (NM) | ΔBAR (deg.) | Roll Angle Overshoot (%) | Rise Time (s) | Settling Time (s) | Max Lateral Deviation (m) | Pre-Roll time, $\zeta_{cs}$ (s) |
|---|---|---|---|---|---|---|---|
| Scenario A | 2.9 | 22.79 | 4.78 | 6.75 | 10.25 | 9.627 | 6.7 |
| Scenario B | 6.6 | 10.46 | 22.4 | 3.63 | 17.75 | −15.01 | 3.6 |
| Scenario C | 11.2 | 6.2 | 31.14 | 2.75 | 30.25 | −12.627 | 2.55 |

By way of another In embodiments, the enhanced guidance laws are used together with the conditions of Scenarios A, B, and C. Results of using the enhanced guidance laws are depicted in Table 2, below, for comparison with the results of Table 1. Based on the overshoot and the Max Lateral Deviation parameters, it is clear that the enhanced guidance laws yield results with less overall error (e.g., less TSE), enabling increased RNP compliance.

TABLE 2

|  | Turn Radius (NM) | ΔBAR (deg.) | Roll Angle Overshoot (%) | Rise Time (s) | Settling Time (s) | Max Lateral Deviation (m) | Pre-Roll time, $\zeta_{en}$ (s) |
|---|---|---|---|---|---|---|---|
| Scenario A | 2.9 | 22.79 | 4.78 | 6.75 | 10.25 | 9.627 | 6.7 |

TABLE 2-continued

|  | Turn Radius (NM) | ΔBAR (deg.) | Roll Angle Overshoot (%) | Rise Time (s) | Settling Time (s) | Max Lateral Deviation (m) | Pre-Roll time, $\zeta_{en}$ (s) |
|---|---|---|---|---|---|---|---|
| Scenario B | 6.6 | 10.46 | 5.6 | 5.5 | 15.25 | 2.846 | 5.45 |
| Scenario C | 11.2 | 6.2 | 7.15 | 5 | 15.38 | 2.148 | 5.06 |

Figure 27:
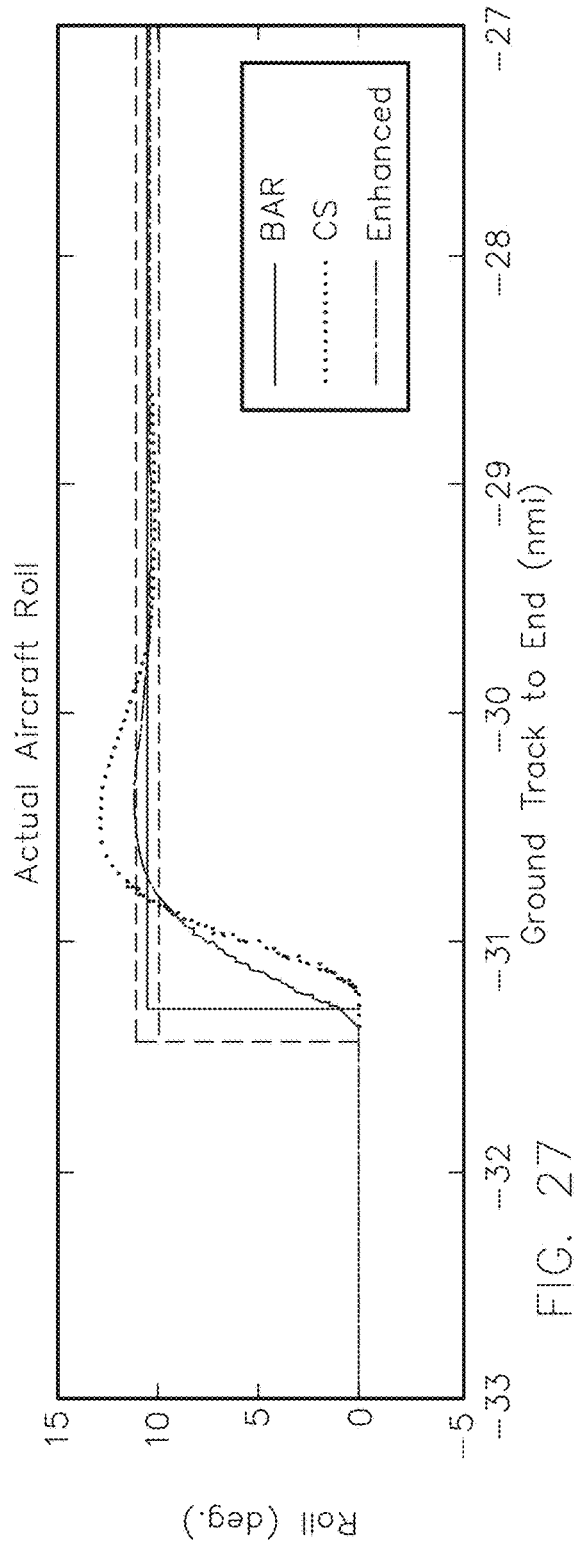
FIG. 27 is an exemplary embodiment of a chart depicting aircraft performance, according to the inventive concepts disclosed herein.

Referring now to FIGS. 27 and 28, Scenario B from Table 1 and Table 2 is graphically depicted with the axes of FIG. 27 being Ground Track to End (NM) vs. Roll (degrees), and the axes of FIG. 28 being Ground Track to End (NM) vs. Lateral Deviation (meters). Observable in FIGS. 27 and 28 is the increased pre-roll time associated with a pre-roll segment (e.g., segment 176 of FIG. 7). Also observable in FIG. 28 are the integrity deviations 236, discussed above. The integrity deviations of FIG. 28 depict RNP containment compliance (e.g., maintaining one or more thresholds). It is noted that FIG. 27 depicts the aircraft performance for the parameters of Scenario B, using the enhanced guidance laws.

Figure 29:
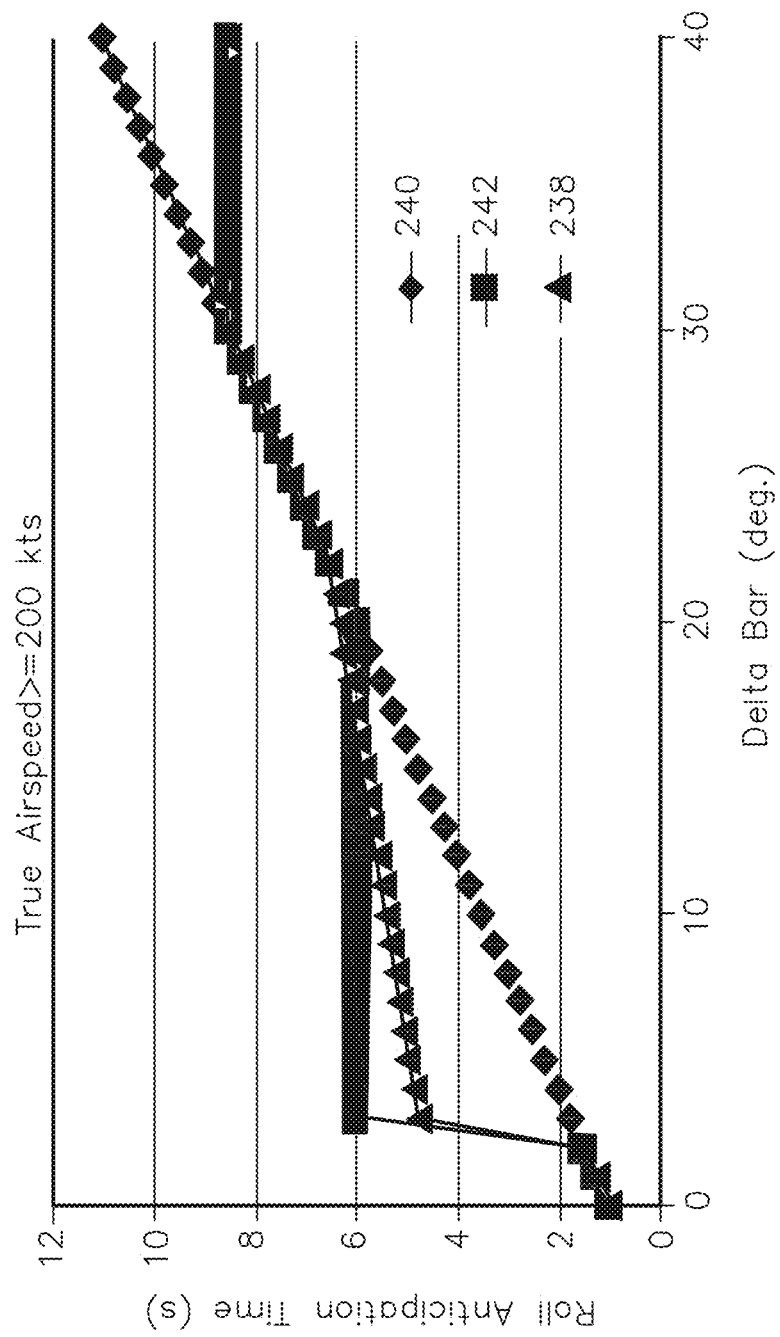
FIG. 29 is an exemplary embodiment of a chart depicting roll anticipation time versus delta bank angle required, according to the inventive concepts disclosed herein.

Referring now to FIG. 29, for the aircraft at a true airspeed of greater than or equal to 200 knots (e.g., VTAS 200), the first pre-roll time 238 for the enhanced guidance laws, $\zeta_{en}$, is adjusted for the two bank angle regions discussed above, while retaining the pre-roll time 240 for conventional control systems, $\zeta_{CS}$, outside the two bank angle regions discussed above. It is noted that in some embodiments above, the true airspeed may be less than 200 knots, in which case the second pre-roll time 242 may be weighted (e.g., more for increased speeds or less for decreased speeds) based on the airspeed, such that the first pre-roll time 238 for the enhanced guidance laws gradually becomes the second pre-roll time 242. In some embodiments, a difference between the first pre-roll time 238 and the second pre-roll time 242 represents a recognition that for reduced aircraft speed, there may be a reduced maneuverability, necessitating a longer pre-roll time (e.g., second pre-roll time 242).

VNAV Function—Capture Mode

A scenario occurs in the Approach Plan consisting of the aircraft cruising at 35,000 ft. (10,668 m) at a speed of 0.8 Mach, making a three degree (3°) descent with no wind. In a conventional system, the VNAV function provides a vertical deviation of −500 ft. upon entry into the Capture Mode. In contrast, using the enhanced guidance laws disclosed herein, the VNAV function provides a 30 ft. maximum vertical deviation during the capture mode. This small amount of vertical deviation using the enhanced guidance laws is more preferable for flight displays. For example, scale factors used to display such vertical deviations may be reduced using the enhanced guidance laws.

Figure 30:
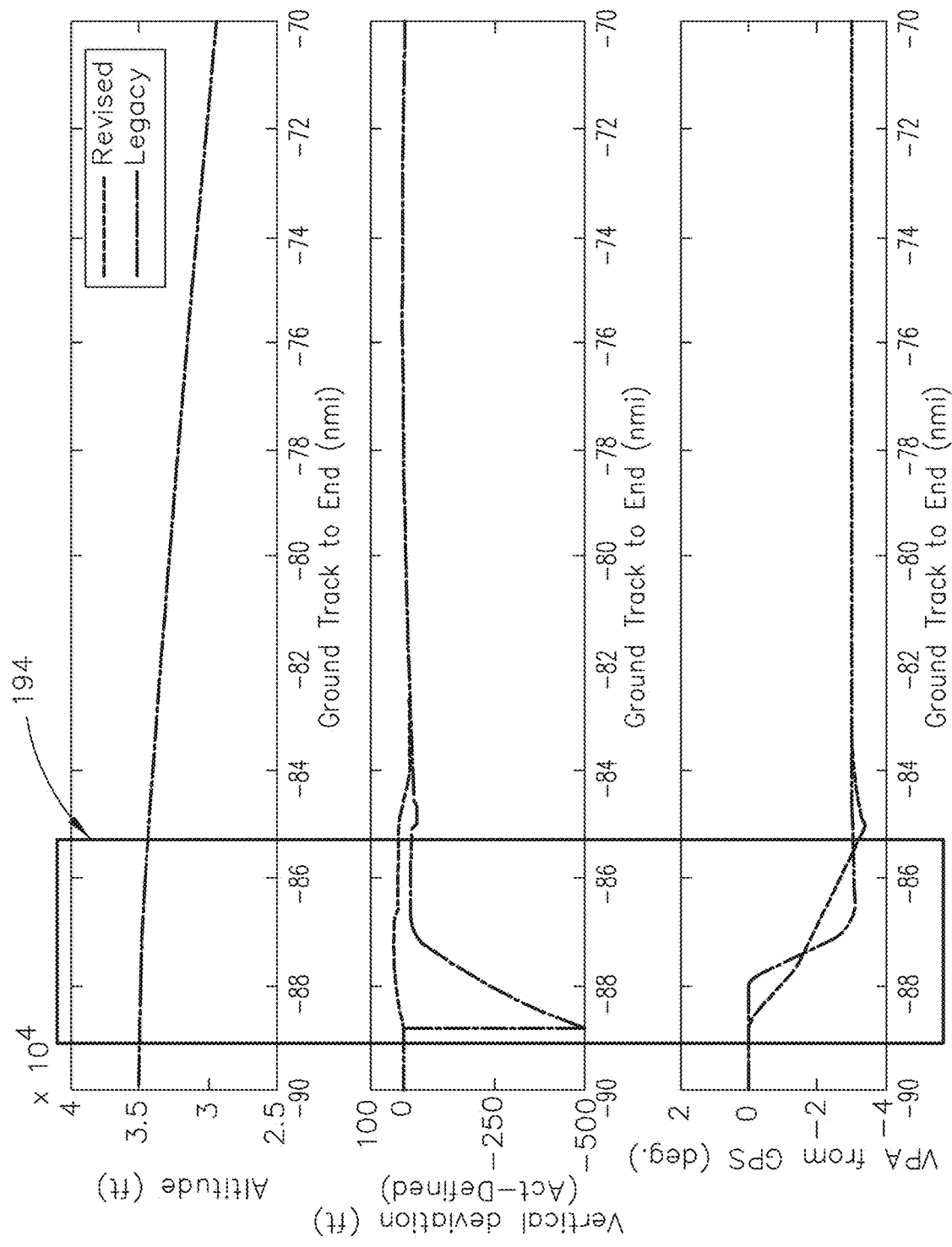
FIG. 30 is an exemplary embodiment of multiple charts depicting aircraft performance with respect to a Capture Mode, according to the inventive concepts disclosed herein.

Referring now to FIG. 30, the performance of the aircraft during the Capture Mode 194 using conventional or legacy guidance laws 244 is compared to the performance of the aircraft using enhanced guidance laws 246. Observable in FIG. 30 is the max 30 ft. vertical deviation as well as a gentle and desired −0.05 g maneuver.

Transition to Track Mode

Figure 31:
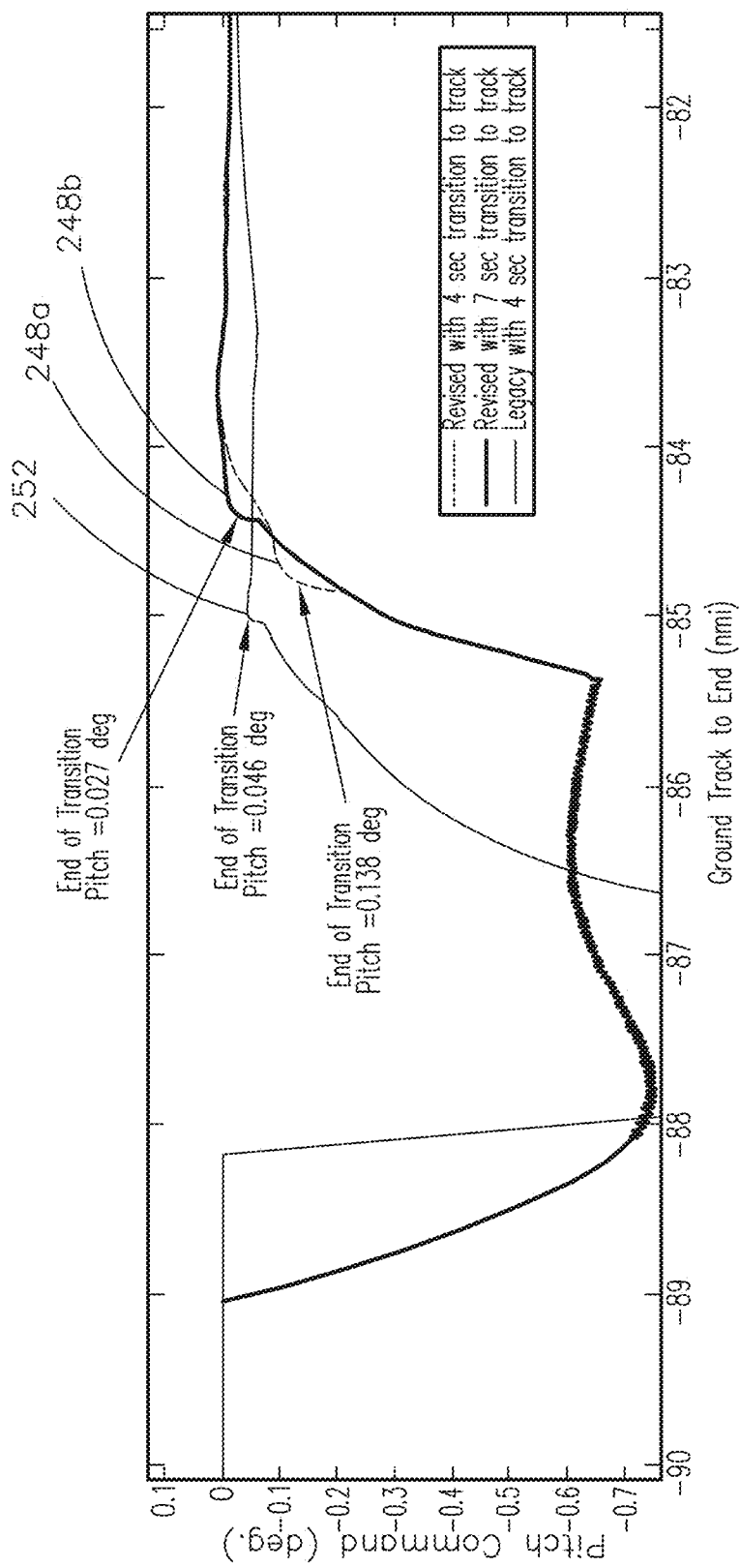
FIG. 31 is an exemplary embodiment of a chart depicting aircraft performance with respect to a pitch command, according to the inventive concepts disclosed herein.

Referring now to FIG. 31, using the conventional or legacy system, a time period associated with the Transition to Track Mode 196 is computed to be about four seconds. In contrast, the Transition to Track Mode 196 yields a time period of about seven seconds with the enhanced guidance laws. The axes of FIG. 31 are Ground Track to End (NM) vs. Pitch Command (degrees). As depicted in FIG. 31, the pitch command 248a using enhanced guidance laws after the four second time period 250 (e.g., at the end of the Transition to Track Mode 196) is compared to the pitch command 252 using conventional or legacy guidance laws for the four second time period 254. Also depicted is a pitch command 248b after a seven second time period 256 using enhanced guidance laws. Observable in FIG. 31 is that the Transition to Track Mode 196 having the seven second period using the enhanced guidance laws provides the closest approximation of an ideal Transition to Track Mode, where error is minimized and the FPA at the end of the transition is close to zero, indicating an accurate tracking of the defined descent path (e.g., 108b).

Track Mode

Figure 32:
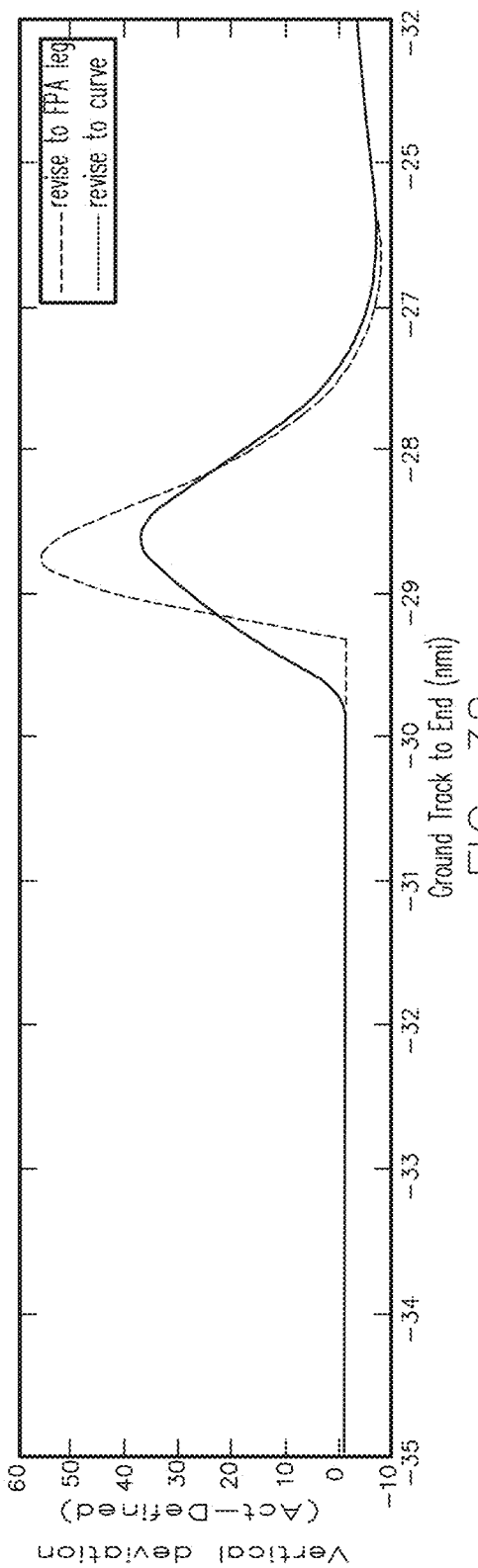
FIGS. 32-35 are exemplary embodiments of charts depicting aircraft performance, according to the inventive concepts disclosed herein.
Figure 33:
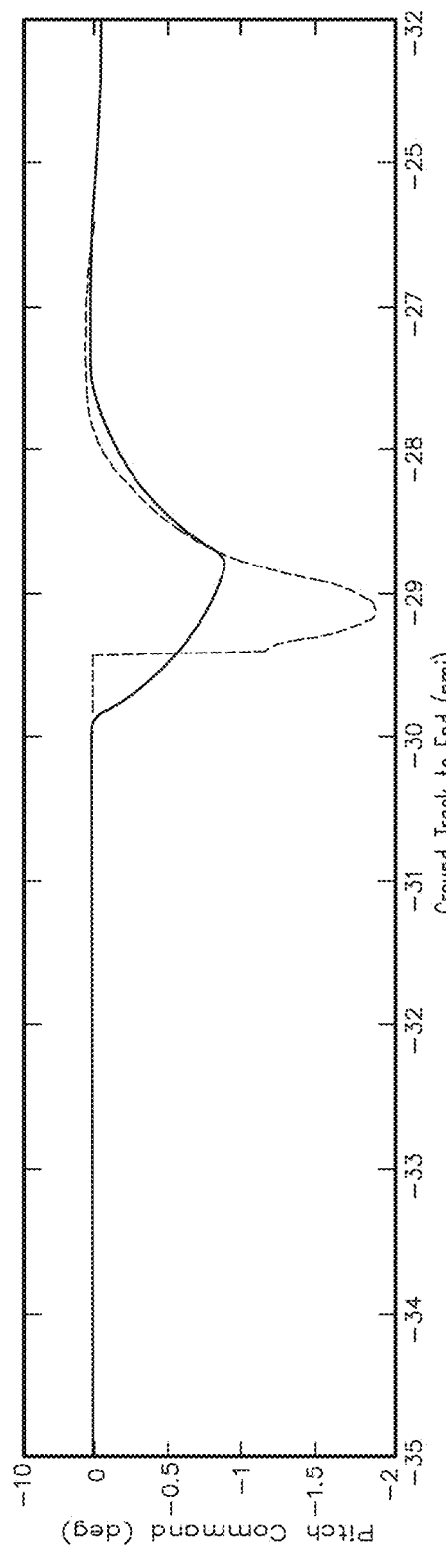
Figure 34:
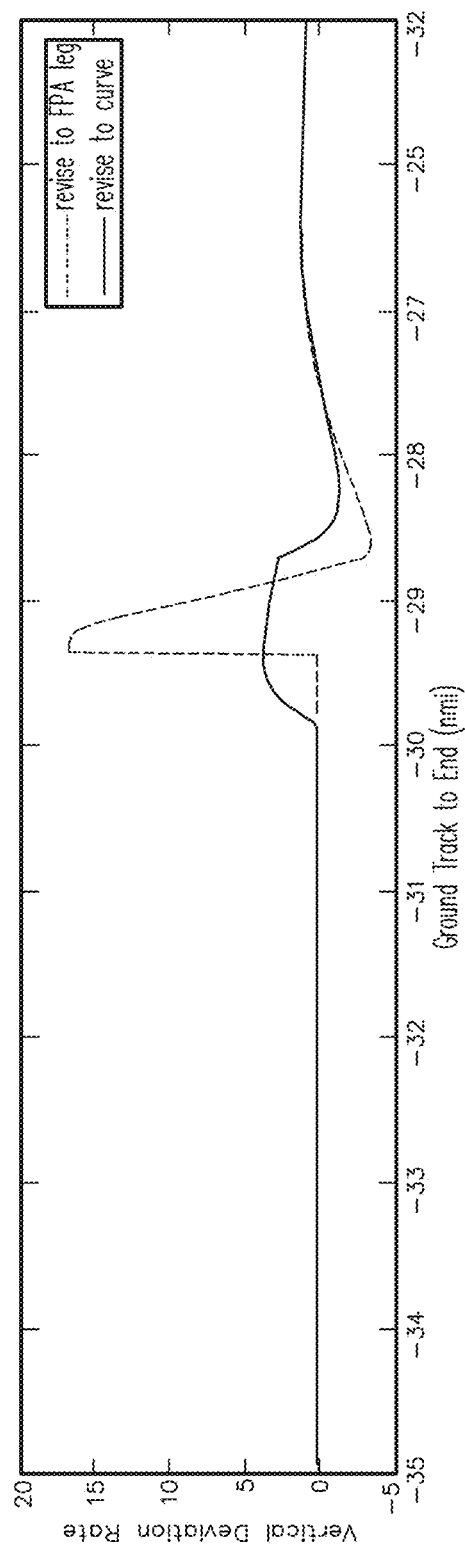
Figure 35:
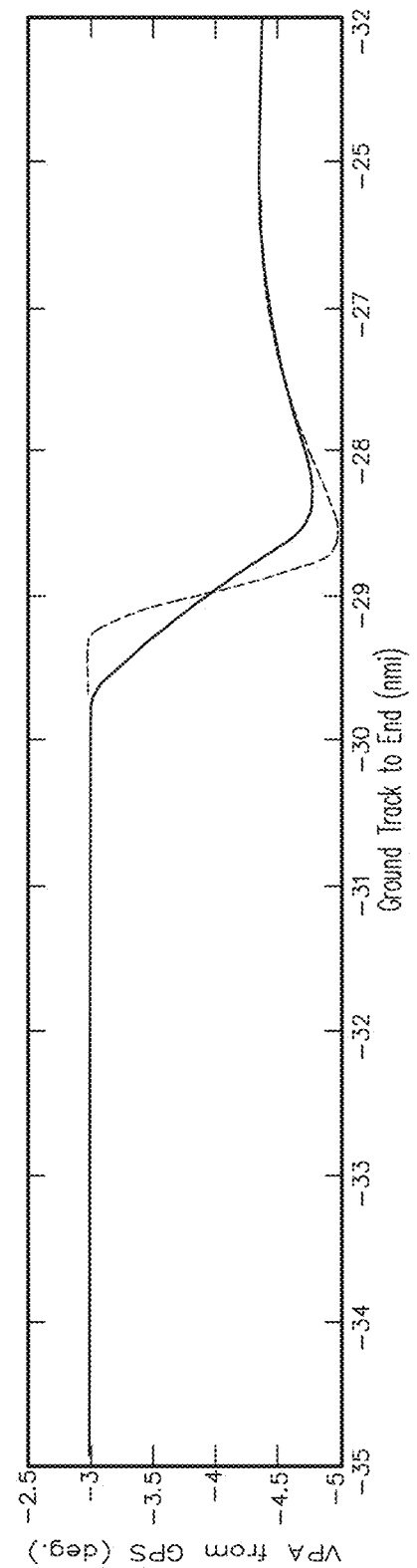

Referring now to FIG. 32, results are depicted on a plot of Ground Track to End (NM) vs. Actual Vertical Deviation (ft.), for legacy guidance laws 244 that determine the deviation relative to the FPA leg, and for enhanced guidance laws 246 that determine the deviation relative to the vertical arc connecting two legs (e.g., arc 190). The FPA discontinuity for the scenario depicted in FIG. 32 is a discontinuity of 1.4 degrees. Observable in FIG. 33 is that the delta pitch command (Δγ) for the enhanced guidance laws 246 starts changing approximately 0.5 NM before the delta pitch command (Δγ) for the legacy guidance laws 244. Thus, the pitch maneuver begins earlier in using the enhanced guidance laws 246 than the legacy guidance laws 244 because the legacy laws are only determining the delta pitch command (Δγ) relative to the descent leg. In other words, the legacy guidance laws 244 do not start the pitch maneuver until the active leg is sequenced, causing an overshoot and larger vertical deviation.

FIGS. 32-35 are exemplary embodiments of charts depicting aircraft performance, according to the inventive concepts disclosed herein. Referring now to Table 3 below, an analysis of the data depicted in FIGS. 32-35 was performed to determine the lower threshold for calculating the vertical deviation relative to the vertical arc during the Track Mode 198 (e.g., FPA threshold). In other words, the analysis was conducted to answer the question: 'when does the hardware and software expend calculation processing to perform guidance relative to the arc 190 during Track Mode 198, as opposed to performing the guidance relative to the descent leg?' As discussed above, and as shown in Table 3, the transition point for performing the guidance relative to the vertical curve (e.g., arc 190) may depend on a desired experienced g-force, or how gradual the transition may be. For example, at an FPA discontinuity of 0.8 degrees, a result of a 2.63% increase in vertical deviation occurred; whereas, at a 1 degree deviation, a result of a 13.83% decrease occurred. Clearly, the more gradual transition is the 2.63% change, so in some embodiments above, the transition point is chosen to be 0.8 degrees.

TABLE 3

| FPA Discontinuity (degrees) | Vertical Deviation | Deviation Rate | Pitch command |
|---|---|---|---|
| 0.5 | Increased 19.51% | Reduced 38.83% | Reduced 7.29% |
| 0.8 | Increased 2.63% | Reduced 60.94% | Reduced 24.03% |
| 1 | Reduced 13.83% | Reduced 68.68% | Reduced 34.62% |
| 1.2 | Reduced 25.04% | Reduced 73.78% | Reduced 45.24% |
| 1.4 | Reduced 34.37% | Reduced 77.37% | Reduced 52.64% |

EXAMPLE—CONCLUSIONS

The enhanced FMS guidance laws enable the accurate tracking of the defined flight paths, including curved ground paths. The Monte Carlo simulation results against the FM specified RNP-0.1 approach (e.g., for National Reagan Airport) are presented. The results indicate that the statistical performance of the enhanced FMS guidance laws comply with the FTE requirements for RNP-0.1 flight operations. Further, lateral deviations were shown to be reduced by more than 30% on the average in affected bank angle regions. In some embodiments, a 72% reduction of lateral deviations was observed. With respect to vertical deviations, in some embodiments, vertical deviations were reduced by a multiple of ten (e.g., 10 times reduction during Capture Mode). For instance, in conventional systems, during a transition from level flight to a descent, a vertical deviation may be experienced of 250 to 500 ft. (76 to 153 m), in contrast, while using the enhanced guidance laws discussed herein, the initial, transitioning vertical deviations (e.g., during Capture Mode) were on average approximately 30 ft. (9.1 m).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An apparatus for precision guidance, comprising:
at least one port for receiving a first input from a database or data structure indicative of a defined path, receiving a second input from a sensor, and for outputting a reference signal; and
a processor configured to access a non-transitory memory with instructions thereon for:
processing the first input to compare adjacent portions of the defined path to determine a discontinuity in the defined path;
defining a containment region and a curved reference line of a non-linear desired path that tracks the defined path, the containment region defined according to a threshold distance on either side of the defined path, and the curved reference line comprising a portion of the containment region interposed between the adjacent portions to span the discontinuity;
comparing a current platform position derived from the second input to a planned platform position derived from the first input to determine a platform deviation relative to at least one of the defined path, the desired path, and the curved reference line;
outputting the reference signal for controlling the platform relative to at least one of the defined path, the desired path, and the curved reference line, to compensate for the deviation and maintain the platform deviation within the threshold distance; and
adjusting one or more actuators based on the reference signal in order to compensate for the deviation and maintain the platform deviation within the threshold distance, the one or more actuators including a hydraulic power pack, servo motor, an engine, a brake, or a control surface, wherein the processor, the non-transitory memory, and the instructions comprise a guidance module having at least one of a proportional-derivative (PD) controller and a proportional-integral (PI) controller configured to generate the reference signal based on at least two controller gains, at least two controller inputs, and a set-point value, and wherein the at least two controller gains and the set-point value are adjustable based on at least one of: platform dynamics and controller mode.

2. The apparatus of claim 1, wherein the at least one port comprises at least one bi-directional port, the processor is in communication with a control system, and the reference signal comprises at least one guidance command for generating at least one control command for a control system of a multi-mode Flight Management System (FMS), the control system performing, directing, or displaying the maneuvering of the platform.

3. The apparatus of claim 1, wherein the curved reference line comprises a portion of a radius to fix (RF) leg, and the reference signal is output to a control system for maneuvering the platform through the RF leg.

4. The apparatus of claim 1, wherein the platform comprises an aircraft and the threshold distance comprises a distance associated with a Required Navigation Performance (RNP) requirement, and wherein the maintaining of the platform deviation within the threshold distance is based on Total System Error (TSE) associated with the aircraft and the RNP requirement.

5. The apparatus of claim 1, wherein the reference signal generates at least one of a roll command and a delta bank angle required (ΔBAR) for maneuvering through a level and coordinated turn, wherein the ΔBAR comprises a difference between a bank angle required (BAR) for a first leg and a BAR for a second leg of the defined path.

6. A method for precision guidance, comprising the steps of:
receiving, via a processor and a memory of a platform, at least one input comprising navigation data indicative of a defined path from a navigation database (NDB) and position data from at least one sensor on-board the platform;
comparing, via the processor, adjacent portions of the defined path to determine a discontinuity in the defined path;

defining, via the processor, a containment region and a curved reference line of a non-linear desired path that tracks the defined path, the containment region defined according to a threshold distance on either side of the defined path, and the curved reference line comprising a portion of the containment region interposed between the adjacent portions to span the discontinuity;

comparing, via the processor, a current platform position derived from the position data to a planned platform position derived from the navigation data to determine a platform deviation relative to at least one of the defined path, the desired path, and the curved reference line; and outputting, to a control system, a reference signal for controlling the platform relative to at least one of the defined path, the desired path, and the curved reference line, to compensate for the deviation and maintain the platform deviation within the threshold distance; and adjusting one or more actuators based on the reference signal in order to compensate for the deviation and maintain the platform deviation within the threshold distance, the one or more actuators including a hydraulic power pack, servo motor, an engine, a brake, or a control surface, wherein the curved reference line comprises an arc of the desired path, and comparing, via the processor, a current platform position derived from the position data to a planned platform position derived from the navigation data to determine a platform deviation relative to the defined path, the desired path, and the curved reference line comprises determining a deviation rate at which the platform deviates from the defined path relative to the arc of the desired path, and wherein the deviation, the deviation rate, and the reference signal are used to generate at least one control command for maneuvering the non-linear desired path including a curved ground path.

7. The method of claim 6, wherein the discontinuity comprises a calculated change in angle of the defined path, and comparing, via the processor, adjacent portions of the defined path to determine a discontinuity in the defined path comprises comparing a first angle of a first segment of a plurality of segments of the defined path with a second angle of a second segment of the plurality of segments of the defined path to calculate the change in angle between the first segment and the second segment.

8. The method of claim 6, wherein comparing, via the processor, a current platform position derived from the position data to a planned platform position derived from the navigation data to determine a platform deviation relative to the defined path, the desired path, and the curved reference line comprises determining at least two deviations comprising a control deviation and an integrity deviation, the control deviation proportional to a time delay between the outputting the reference signal and the controlling or moving of the platform as a result of the reference signal, and the integrity deviation indicating if the platform is within the threshold distance from the defined path according to at least one degree of accuracy.

9. The method of claim 8, wherein the reference signal is output at a first point in time and the controlling of the platform or a movement of the platform occurs a second point in time, a difference between the first point in time and the second point in time proportional to the time delay.

10. The method of claim 9, wherein the time delay comprises a pre-roll time, the reference signal generates a ΔBAR command based on the control deviation, and when (i) the ΔBAR is greater than approximately two degrees (2°) and less than or equal to approximately 22 degrees then the pre-roll time comprises 0.5 to seven seconds, and when (ii) the ΔBAR is less than two degrees (2°) or greater than 22 degrees, then the pre-roll time is determined by a function comprising:

$$\zeta_{en} = 1 + \frac{0.75 * \Delta BAR}{3} \text{ wherein, } \zeta_{en}$$

is the pre-roll time.

11. The method of claim 10, wherein when the ΔBAR is greater than approximately two degrees (2°) and less than or equal to approximately 22 degrees then the pre-roll time comprises five to seven seconds.

12. The method of claim 6, further comprising:
determining a radius of a curvature of the curved reference line by selecting a desired g-force associated with maneuvering the platform through the curvature, wherein the radius is used for determining a point in time when the outputting of the reference signal for controlling the platform occurs.

13. The method of claim 6, further comprising:
obtaining a wind vector including a wind angle; and
determining a track angle difference, the track angle difference determined as an angle between a track angle of the platform and the wind angle, and (i) when the track angle difference is greater than 180 degrees (180°) or less than −180° then the track angle difference is scaled to a 180 degree window, (ii) when the scaled track angle difference is between one and 179 degrees (179°) of the 180 degree window, inclusive, then a BAR or a roll command turn bias, ϕ, is determined by a first function comprising:

$$\Phi = \tan^{-1}\left(\frac{2 * TAS * (GS)^3}{g_z R_G * [(TAS)^2 + (GS)^2 - (W)^2]}\right),$$

and (iii) when the scaled track angle difference is not between one and 179°, then the BAR or the roll command turn bias, ϕ, is determined by a second function comprising:

$$\Phi = \tan^{-1}\left(\frac{(GS)^2}{g_z R_G}\right),$$

wherein GS comprises a ground speed in knots, $R_G$ comprises a turn radius of the desired non-linear path relative to ground, $g_z$ comprises gravity in $NM/hr^2$, W comprises wind speed in knots, and TAS comprises true airspeed in knots.

14. The method of claim 6, further comprising:
filtering a signal associated with at least one of: a cross-track velocity, a delta flight path angle command, a vertical acceleration detection (VAD), and a deviation rate.

15. The method of claim 6, further comprising:
applying a flag or data bit to enable the processor to determine that a curvature of the curved reference line is associated with at least one of: a right turn, a left turn, a descent, or an ascent.

16. A method for precision guidance, comprising the steps of:

receiving, via a processor and a memory of a platform, at least one input comprising navigation data indicative of a defined path from a navigation database (NDB) and position data from at least one sensor on-board the platform;

comparing, via the processor, adjacent portions of the defined path to determine a discontinuity in the defined path;

defining, via the processor, a containment region and a curved reference line of a non-linear desired path that tracks the defined path, the containment region defined according to a threshold distance on either side of the defined path, and the curved reference line comprising a portion of the containment region interposed between the adjacent portions to span the discontinuity;

comparing, via the processor, a current platform position derived from the position data to a planned platform position derived from the navigation data to determine a platform deviation relative to at least one of the defined path, the desired path, and the curved reference line; and outputting, to a control system, a reference signal for controlling the platform relative to at least one of the defined path, the desired path, and the curved reference line, to compensate for the deviation and maintain the platform deviation within the threshold distance; and adjusting one or more actuators based on the reference signal in order to compensate for the deviation and maintain the platform deviation within the threshold distance, the one or more actuators including a hydraulic power pack, servo motor, an engine, a brake, or a control surface, wherein comparing, via the processor, a current platform position derived from the position data to a planned platform position derived from the navigation data to determine a platform deviation relative to the defined path, the desired path, and the curved reference line comprises determining at least two deviations comprising a control deviation and an integrity deviation, the control deviation proportional to a time delay between the outputting the reference signal and the controlling or moving of the platform as a result of the reference signal, and the integrity deviation indicating if the platform is within the threshold distance from the defined path according to at least one degree of accuracy.

17. A method for precision guidance, comprising the steps of:

receiving, via a processor and a memory of a platform, at least one input comprising navigation data indicative of a defined path from a navigation database (NDB) and position data from at least one sensor on-board the platform;

comparing, via the processor, adjacent portions of the defined path to determine a discontinuity in the defined path;

defining, via the processor, a containment region and a curved reference line of a non-linear desired path that tracks the defined path, the containment region defined according to a threshold distance on either side of the defined path, and the curved reference line comprising a portion of the containment region interposed between the adjacent portions to span the discontinuity;

comparing, via the processor, a current platform position derived from the position data to a planned platform position derived from the navigation data to determine a platform deviation relative to at least one of the defined path, the desired path, and the curved reference line; and outputting, to a control system, a reference signal for controlling the platform relative to at least one of the defined path, the desired path, and the curved reference line, to compensate for the deviation and maintain the platform deviation within the threshold distance;

adjusting one or more actuators based on the reference signal in order to compensate for the deviation and maintain the platform deviation within the threshold distance, the one or more actuators including a hydraulic power pack, servo motor, an engine, a brake, or a control surface;

obtaining a wind vector including a wind angle; and determining a track angle difference, the track angle difference determined as an angle between a track angle of the platform and the wind angle, and (i) when the track angle difference is greater than 180 degrees (180°) or less than −180° then the track angle difference is scaled to a 180 degree window, (ii) when the scaled track angle difference is between one and 179 degrees (179°) of the 180 degree window, inclusive, then a BAR or a roll command turn bias, $\phi$, is determined by a first function comprising:

$$\Phi = \tan^{-1}\left(\frac{2*TAS*(GS)^3}{g_z R_G * [(TAS)^2 + (GS)^2 - (W)^2]}\right),$$

and (iii) when the scaled track angle difference is not between one and 179°, then the BAR or the roll command turn bias, $\phi$, is determined by a second function comprising:

$$\Phi = \tan^{-1}\left(\frac{(GS)^2}{g_z R_G}\right),$$

wherein GS comprises a ground speed in knots, $R_G$ comprises a turn radius of the desired non-linear path relative to ground, $g_z$ comprises gravity in NM/hr$^2$, W comprises wind speed in knots, and TAS comprises true airspeed in knots.

* * * * *